(12) United States Patent
Xu et al.

(10) Patent No.: US 12,498,051 B2
(45) Date of Patent: *Dec. 16, 2025

(54) GRADIENT MATERIAL STRUCTURES AND METHODS OF FORMING THE SAME

(71) Applicant: Vulcan Industrial Holdings, LLC, Houston, TX (US)

(72) Inventors: Zhiyue Xu, Cypress, TX (US); Jason David Smith, Porter, TX (US)

(73) Assignee: Vulcan Industrial Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/943,574

(22) Filed: Nov. 11, 2024

(65) Prior Publication Data
US 2025/0075818 A1 Mar. 6, 2025

Related U.S. Application Data

(63) Continuation of application No. 18/099,069, filed on Jan. 19, 2023, now Pat. No. 12,140,240.

(60) Provisional application No. 63/300,874, filed on Jan. 19, 2022.

(51) Int. Cl.
*F16K 25/00* (2006.01)
*C23C 4/12* (2016.01)
*F16K 1/42* (2006.01)

(52) U.S. Cl.
CPC .............. *F16K 25/005* (2013.01); *C23C 4/12* (2013.01); *F16K 1/42* (2013.01)

(58) Field of Classification Search
CPC .......... F16K 25/005; F16K 1/42; F16K 15/06; C23C 4/12; F04B 53/1087; F04B 39/10; F04B 39/1013

USPC .................................................. 251/359, 369
See application file for complete search history.

(56) References Cited

U.S. PATENT DOCUMENTS

| 1,316,539 A | 9/1919 | Ford |
| 1,364,848 A | 1/1921 | Walsh |
| 1,576,269 A | 3/1926 | Durant |
| 1,595,459 A | 8/1926 | Durant |

(Continued)

FOREIGN PATENT DOCUMENTS

| CN | 2556355 Y | 6/2003 |
| CN | 201149099 | 11/2008 |

(Continued)

OTHER PUBLICATIONS

Flowserve, "Dynamic Balance Plug Valve and Double DB Plug Valve: Installation, Operation and Maintenance," 2011, https://www.flowserve.com/sites/default/files/2016-07/NVENIM2005-00_0.pdf, 36 pages.

(Continued)

*Primary Examiner* — Daphne M Barry
(74) *Attorney, Agent, or Firm* — Womble Bond Dickinson (US) LLP

(57) ABSTRACT

A valve seat for a pumping assembly. The valve seat includes a body including a gradient material structure that defines a strike face for the valve seat. The gradient material structure has a first material, a second material spaced from the first material, and a smooth compositional transition between the first material and the second material. In addition, the valve seat includes a bore extending through the body.

30 Claims, 11 Drawing Sheets

(56) References Cited

U.S. PATENT DOCUMENTS

| | | |
|---|---|---|
| 1,671,139 A | 5/1928 | Wilson |
| 1,836,068 A | 12/1931 | Goldsberry |
| 1,873,318 A | 8/1932 | Eason |
| 1,914,737 A | 6/1933 | Elms |
| 1,948,628 A | 2/1934 | Penick |
| 1,963,684 A | 6/1934 | Shimer |
| 1,963,685 A | 6/1934 | Shimer |
| 2,011,547 A | 8/1935 | Campbell |
| 2,069,443 A | 2/1937 | Hill |
| 2,103,504 A | 12/1937 | White |
| 2,143,399 A | 1/1939 | Abercrombie |
| 2,146,709 A | 2/1939 | Bird |
| 2,151,442 A | 3/1939 | Hardy |
| 2,163,472 A | 6/1939 | Shimer |
| 2,252,488 A | 8/1941 | Bierend |
| 2,304,991 A | 12/1942 | Foster |
| 2,506,128 A | 5/1950 | Ashton |
| 2,539,996 A | 1/1951 | Gleitz |
| 2,547,831 A | 4/1951 | Mueller |
| 2,713,522 A | 7/1955 | Lorenz |
| 2,719,737 A | 10/1955 | Fletcher |
| 2,745,631 A | 5/1956 | Shellman |
| 2,756,960 A | 7/1956 | Church |
| 2,898,082 A | 8/1959 | Von Almen |
| 2,969,951 A | 1/1961 | Walton |
| 2,977,874 A | 4/1961 | Ritzerfeld et al. |
| 2,982,515 A | 5/1961 | Clinton |
| 2,983,281 A | 5/1961 | Bynum |
| 3,049,082 A | 8/1962 | Barry |
| 3,053,500 A | 9/1962 | Atkinson |
| 3,063,467 A | 11/1962 | Roberts, Jr. |
| 3,120,960 A | 2/1964 | Pippert et al. |
| 3,166,332 A | 1/1965 | Olson |
| 3,224,817 A | 12/1965 | Carter |
| 3,276,390 A | 10/1966 | Bloudoff |
| 3,277,837 A | 10/1966 | Pangburn |
| 3,288,475 A | 11/1966 | Benoit |
| 3,459,363 A | 8/1969 | Miller |
| 3,474,808 A | 10/1969 | Elliott |
| 3,483,885 A | 12/1969 | Leathers |
| 3,489,098 A | 1/1970 | Roth |
| 3,489,170 A | 1/1970 | Leman |
| 3,512,787 A | 5/1970 | Kennedy |
| 3,590,387 A | 6/1971 | Landis |
| 3,640,501 A | 2/1972 | Walton |
| 3,652,098 A | 3/1972 | Kawazu et al. |
| 3,698,726 A | 10/1972 | Schettler |
| 3,738,665 A | 6/1973 | Bilco |
| 3,785,659 A | 1/1974 | Maurer et al. |
| 3,809,508 A | 5/1974 | Uchiyama |
| 3,847,511 A | 11/1974 | Cole |
| 3,907,307 A | 9/1975 | Maurer |
| 3,931,755 A | 1/1976 | Hatridge |
| 4,044,834 A | 8/1977 | Perkins |
| 4,076,212 A | 2/1978 | Leman |
| 4,184,814 A | 1/1980 | Parker |
| 4,219,204 A | 8/1980 | Pippert |
| 4,277,229 A | 7/1981 | Pacht |
| 4,306,728 A | 12/1981 | Huperz |
| 4,331,741 A | 5/1982 | Wilson |
| 4,395,050 A | 7/1983 | Wirz |
| 4,398,731 A | 8/1983 | Gorman |
| 4,440,404 A | 4/1984 | Roach |
| 4,500,267 A | 2/1985 | Birdwell |
| 4,508,133 A | 4/1985 | Hamid |
| 4,518,359 A | 5/1985 | Yao-Psong |
| 4,527,806 A | 7/1985 | Ungchusri |
| 4,565,297 A | 1/1986 | Korner |
| 4,580,791 A | 4/1986 | DiRusso |
| 4,662,392 A | 5/1987 | Vadasz |
| 4,754,950 A | 7/1988 | Tada |
| 4,763,876 A | 8/1988 | Oda |
| 4,768,933 A | 9/1988 | Stachowiak |
| 4,770,206 A | 9/1988 | Sjoberg |
| 4,807,890 A | 2/1989 | Gorman |
| 4,811,758 A | 3/1989 | Piper |
| 4,822,058 A | 4/1989 | Butler et al. |
| 4,861,241 A | 8/1989 | Gamboa |
| 4,872,395 A | 10/1989 | Bennitt et al. |
| 4,878,815 A | 11/1989 | Stachowiak |
| 4,919,719 A | 4/1990 | Abe |
| 4,951,707 A | 8/1990 | Johnson |
| 5,020,490 A | 6/1991 | Seko |
| 5,052,435 A | 10/1991 | Crudup |
| 5,061,159 A | 10/1991 | Pryor |
| 5,062,450 A | 11/1991 | Bailey |
| 5,073,096 A | 12/1991 | King et al. |
| 5,080,713 A | 1/1992 | Ishibashi |
| 5,088,521 A | 2/1992 | Johnson |
| 5,127,807 A | 7/1992 | Eslinger |
| 5,131,666 A | 7/1992 | Hutchens |
| 5,135,238 A | 8/1992 | Wells |
| 5,149,107 A | 9/1992 | Maringer |
| 5,201,491 A | 4/1993 | Domangue |
| 5,209,495 A | 5/1993 | Palmour |
| 5,249,600 A | 10/1993 | Blume |
| 5,267,736 A | 12/1993 | Pietsch |
| 5,273,570 A | 12/1993 | Sato |
| 5,299,812 A | 4/1994 | Brestel |
| 5,314,659 A | 5/1994 | Hidaka |
| 5,362,215 A | 11/1994 | King |
| 5,382,057 A | 1/1995 | Richter |
| 5,478,048 A | 12/1995 | Salesky |
| 5,493,951 A | 2/1996 | Harrison |
| 5,533,245 A | 7/1996 | Stanton |
| 5,540,570 A | 7/1996 | Schuller |
| 5,572,920 A | 11/1996 | Kennedy |
| 5,593,166 A | 1/1997 | Lovell et al. |
| 5,626,345 A | 5/1997 | Wallace |
| 5,636,688 A | 6/1997 | Bassinger |
| 5,674,449 A | 10/1997 | Liang |
| 5,806,858 A | 9/1998 | Harrelson, III |
| 5,834,664 A | 11/1998 | Aonuma |
| 5,859,376 A | 1/1999 | Ishibashi |
| 5,895,517 A | 4/1999 | Kawamura |
| 5,924,853 A | 7/1999 | Pacht |
| 5,949,003 A | 9/1999 | Aoki |
| 6,139,599 A | 10/2000 | Takahashi |
| 6,200,688 B1 | 3/2001 | Liang |
| 6,209,445 B1 | 4/2001 | Roberts, Jr. |
| 6,328,312 B1 | 12/2001 | Schmitz |
| 6,340,377 B1 | 1/2002 | Kawata |
| 6,382,940 B1 | 5/2002 | Blume |
| 6,386,548 B1 | 5/2002 | Grimanis et al. |
| 6,436,338 B1 | 8/2002 | Qiao |
| 6,446,939 B1 | 9/2002 | Hoppe |
| 6,460,620 B1 | 10/2002 | LaFleur |
| 6,464,749 B1 | 10/2002 | Kawase |
| 6,482,275 B1 | 11/2002 | Qiao |
| 6,485,678 B1 | 11/2002 | Liang |
| 6,544,012 B1 | 4/2003 | Blume |
| 6,571,684 B1 | 6/2003 | Nov et al. |
| 6,623,259 B1 | 9/2003 | Blume |
| 6,634,236 B2 | 10/2003 | Mars |
| 6,641,112 B2 | 11/2003 | Antoff |
| 6,695,007 B2 | 2/2004 | Vicars |
| 6,702,905 B1 | 3/2004 | Qiao |
| 6,880,802 B2 | 4/2005 | Hara |
| 6,910,871 B1 | 6/2005 | Blume |
| 6,916,444 B1 | 7/2005 | Liang |
| 6,951,165 B2 | 10/2005 | Kuhn |
| 6,951,579 B2 | 10/2005 | Koyama |
| 6,955,181 B1 | 10/2005 | Blume |
| 6,959,916 B2 | 11/2005 | Chigasaki |
| 7,000,632 B2 | 2/2006 | McIntire |
| 7,036,824 B2 | 5/2006 | Kunz |
| 7,144,440 B2 | 12/2006 | Ando |
| 7,168,440 B1 | 1/2007 | Blume |
| 7,186,097 B1 | 3/2007 | Blume |
| 7,222,837 B1 | 5/2007 | Blume |
| 7,290,560 B2 | 11/2007 | Orr |
| 7,296,591 B2 | 11/2007 | Moe |
| 7,335,002 B2 | 2/2008 | Vicars |
| 7,341,435 B2 | 3/2008 | Vicars |

(56) References Cited

U.S. PATENT DOCUMENTS

| | | |
|---|---|---|
| 7,398,955 B2 | 7/2008 | Weingarten |
| 7,506,574 B2 | 3/2009 | Jensen |
| 7,513,483 B1 | 4/2009 | Blume |
| 7,513,759 B1 | 4/2009 | Blume |
| 7,562,675 B2 | 7/2009 | Nomichi et al. |
| 7,611,590 B2 | 11/2009 | Liang |
| 7,681,589 B2 | 3/2010 | Schwegman |
| 7,682,471 B2 | 3/2010 | Levin |
| 7,726,026 B1 | 6/2010 | Blume |
| 7,748,310 B2 | 7/2010 | Kennedy |
| 7,754,142 B2 | 7/2010 | Liang |
| 7,754,143 B2 | 7/2010 | Qiao |
| 7,757,396 B2 | 7/2010 | Sawada |
| 7,789,133 B2 | 9/2010 | McGuire |
| 7,789,161 B2 | 9/2010 | Riley |
| 7,793,913 B2 | 9/2010 | Hara |
| 7,828,053 B2 | 11/2010 | McGuire |
| 7,845,413 B2 | 12/2010 | Shampine |
| 7,861,738 B2 | 1/2011 | Erbes |
| 7,866,346 B1 | 1/2011 | Walters |
| 7,891,374 B2 | 2/2011 | Vicars |
| 7,931,078 B2 | 4/2011 | Toporowski et al. |
| 7,954,510 B2 | 6/2011 | Schwegman |
| 7,992,635 B2 | 8/2011 | Cherewyk |
| 8,020,638 B2 | 9/2011 | Chellappa et al. |
| 8,069,923 B2 | 12/2011 | Blanco |
| 8,075,000 B2 | 12/2011 | James et al. |
| 8,075,661 B2 | 12/2011 | Chen |
| 8,083,506 B2 | 12/2011 | Maki |
| 8,100,407 B2 | 1/2012 | Stanton |
| 8,141,849 B1 | 3/2012 | Blume |
| 8,147,227 B1 | 4/2012 | Blume |
| 8,181,970 B2 | 5/2012 | Smith |
| 8,201,832 B2 | 6/2012 | Kocurek |
| 8,261,771 B2 | 9/2012 | Witkowski |
| 8,287,256 B2 | 10/2012 | Shafer |
| 8,291,927 B2 | 10/2012 | Johnson |
| 8,292,301 B1 | 10/2012 | Gilstad et al. |
| 8,312,805 B1 | 11/2012 | Blume |
| 8,317,498 B2 | 11/2012 | Gambier |
| 8,328,202 B2 | 12/2012 | Foster et al. |
| 8,375,980 B2 | 2/2013 | Higashiyama |
| 8,376,723 B2 | 2/2013 | Kugelev |
| 8,402,880 B2 | 3/2013 | Patel |
| 8,430,075 B2 | 4/2013 | Qiao |
| D687,125 S | 7/2013 | Hawes |
| 8,479,700 B2 | 7/2013 | Qiao |
| 8,511,218 B2 | 8/2013 | Cordes |
| 8,522,667 B2 | 9/2013 | Clemens |
| 8,528,585 B2 | 9/2013 | McGuire |
| 8,529,230 B1 | 9/2013 | Colley, III et al. |
| 8,534,691 B2 | 9/2013 | Schaffer |
| 8,613,886 B2 | 12/2013 | Qiao |
| D700,682 S | 3/2014 | Bayyouk et al. |
| 8,662,864 B2 | 3/2014 | Bayyouk |
| 8,662,865 B2 | 3/2014 | Bayyouk |
| 8,668,470 B2 | 3/2014 | Bayyouk |
| 8,707,853 B1 | 4/2014 | Dille |
| 8,733,313 B2 | 5/2014 | Sato |
| 8,784,081 B1 | 7/2014 | Blume |
| 8,814,139 B2 | 8/2014 | Griffin et al. |
| 8,814,432 B2 | 8/2014 | Thoma et al. |
| 8,828,312 B2 | 9/2014 | Yao |
| 8,870,554 B2 | 10/2014 | Kent |
| 8,893,806 B2 | 11/2014 | Williamson |
| 8,894,392 B1 | 11/2014 | Blume |
| 8,915,722 B1 | 12/2014 | Blume |
| 8,940,110 B2 | 1/2015 | Qiao |
| 8,955,850 B2 | 2/2015 | Saucerman et al. |
| 8,978,695 B2 | 3/2015 | Witkowski |
| 8,998,593 B2 | 4/2015 | Vicars |
| 9,010,412 B2 | 4/2015 | McGuire |
| 9,016,693 B1 | 4/2015 | Shek et al. |
| 9,067,346 B2 | 6/2015 | Kohn et al. |
| 9,103,448 B2 | 8/2015 | Witkowski |
| 9,121,503 B2 | 9/2015 | Dietle et al. |
| 9,150,945 B2 | 10/2015 | Bei |
| 9,157,136 B2 | 10/2015 | Chou |
| 9,157,468 B2 | 10/2015 | Dille |
| 9,188,242 B2 | 11/2015 | Giove et al. |
| 9,206,910 B2 | 12/2015 | Kahn |
| D748,228 S | 1/2016 | Bayyouk |
| 9,243,630 B2 | 1/2016 | Foote |
| 9,260,933 B2 | 2/2016 | Artherholt |
| 9,261,195 B2 | 2/2016 | Toynbee |
| 9,273,543 B2 | 3/2016 | Baca |
| 9,284,631 B2 | 3/2016 | Radon |
| 9,284,953 B2 | 3/2016 | Blume |
| 9,285,040 B2 | 3/2016 | Forrest |
| 9,291,274 B1 | 3/2016 | Blume |
| 9,322,243 B2 | 4/2016 | Baca |
| 9,334,547 B2 | 5/2016 | Qiao |
| 9,340,856 B2 | 5/2016 | Otobe |
| 9,341,039 B2 | 5/2016 | Galle et al. |
| 9,359,921 B2 | 6/2016 | Hashimoto |
| 9,360,115 B2 | 6/2016 | Chaplin et al. |
| 9,365,913 B2 | 6/2016 | Imaizumi |
| 9,371,919 B2 | 6/2016 | Forrest |
| 9,376,930 B2 | 6/2016 | Kim |
| 9,377,019 B1 | 6/2016 | Blume |
| 9,382,940 B2 | 7/2016 | Lee |
| 9,416,887 B2 | 8/2016 | Blume |
| 9,435,454 B2 | 9/2016 | Blume |
| 9,441,776 B2 | 9/2016 | Bryne |
| 9,458,743 B2 | 10/2016 | Qiao |
| 9,464,730 B2 | 10/2016 | Bihlet |
| 9,500,195 B2 | 11/2016 | Blume |
| 9,506,382 B2 | 11/2016 | Yeager |
| 9,528,508 B2 | 12/2016 | Thomeer |
| 9,528,631 B2 | 12/2016 | McCarty |
| 9,534,473 B2 | 1/2017 | Morris |
| 9,534,691 B2 | 1/2017 | Miller |
| 9,556,761 B2 | 1/2017 | Koyama |
| 9,568,138 B2 | 2/2017 | Arizpe |
| 9,605,767 B2 | 3/2017 | Chhabra |
| 9,631,739 B2 | 4/2017 | Belshan |
| D787,029 S | 5/2017 | Bayyouk |
| 9,638,075 B2 | 5/2017 | Qiao |
| 9,638,337 B2 | 5/2017 | Witkowski |
| 9,650,882 B2 | 5/2017 | Zhang |
| 9,651,067 B2 | 5/2017 | Beschorner |
| 9,689,364 B2 | 6/2017 | Mack |
| 9,695,812 B2 | 7/2017 | Dille |
| 9,732,746 B2 | 8/2017 | Chandrasekaran |
| 9,732,880 B2 | 8/2017 | Haines |
| 9,745,968 B2 | 8/2017 | Kotapish |
| 9,784,262 B2 | 10/2017 | Bayyouk |
| 9,791,082 B2 | 10/2017 | Baxter et al. |
| 9,822,894 B2 | 11/2017 | Bayyouk |
| 9,845,801 B1 | 12/2017 | Shek |
| 9,857,807 B2 | 1/2018 | Baca |
| 9,915,250 B2 | 3/2018 | Brasche |
| 9,920,615 B2 | 3/2018 | Zhang |
| 9,927,036 B2 | 3/2018 | Dille |
| 9,945,362 B2 | 4/2018 | Skurdalsvold |
| 9,945,375 B2 | 4/2018 | Zhang |
| 9,957,770 B2 | 5/2018 | Averill et al. |
| 9,989,044 B2 | 6/2018 | Bayyouk |
| 10,029,540 B2 | 7/2018 | Seeger |
| D826,281 S | 8/2018 | Mead |
| 10,041,490 B1 | 8/2018 | Jahnke |
| 10,082,137 B2 | 9/2018 | Graham |
| 10,094,478 B2 | 10/2018 | Iijima |
| 10,113,679 B2 | 10/2018 | Shuck |
| 10,184,470 B2 | 1/2019 | Barnett, Jr. |
| 10,190,197 B2 | 1/2019 | Baker |
| 10,197,172 B2 | 2/2019 | Fuller |
| 10,215,172 B2 | 2/2019 | Wood |
| 10,221,848 B2 | 3/2019 | Bayyouk |
| 10,240,594 B2 | 3/2019 | Barnhouse, Jr. |
| 10,240,597 B2 | 3/2019 | Bayyouk |
| 10,247,182 B2 | 4/2019 | Zhang |
| 10,247,184 B2 | 4/2019 | Chunn |
| 10,260,634 B2 | 4/2019 | Lenhert et al. |

(56) References Cited

U.S. PATENT DOCUMENTS

| | | |
|---|---|---|
| 10,273,954 B2 | 4/2019 | Brown |
| 10,288,178 B2 | 5/2019 | Nowell |
| 10,309,182 B2 | 6/2019 | Jones et al. |
| 10,316,832 B2 | 6/2019 | Byrne |
| 10,330,097 B2 | 6/2019 | Skurdalsvold |
| 10,344,757 B1 | 7/2019 | Stark |
| 10,364,487 B2 | 7/2019 | Park |
| D856,498 S | 8/2019 | Bayyouk |
| 10,378,535 B2 | 8/2019 | Mahmood |
| 10,378,538 B2 | 8/2019 | Blume |
| 10,378,659 B2 | 8/2019 | Scott et al. |
| 10,393,113 B2 | 8/2019 | Wagner |
| 10,400,764 B2 | 9/2019 | Wagner |
| 10,415,348 B2 | 9/2019 | Zhang |
| 10,415,719 B2 | 9/2019 | Leboeuf et al. |
| D861,834 S | 10/2019 | Foster et al. |
| D864,691 S | 10/2019 | Campos |
| 10,428,406 B2 | 10/2019 | Yao |
| 10,428,949 B2 | 10/2019 | Miller |
| 10,436,193 B1 | 10/2019 | Jahnke |
| 10,443,456 B2 | 10/2019 | Hoeg |
| 10,465,680 B1 | 11/2019 | Guerra |
| 10,472,702 B2 | 11/2019 | Yeh |
| 10,487,528 B2 | 11/2019 | Pozybill |
| D871,455 S | 12/2019 | Crowsley |
| 10,519,070 B2 | 12/2019 | Sanders |
| 10,519,950 B2 | 12/2019 | Foster |
| 10,526,862 B2 | 1/2020 | Witkowski |
| 10,527,036 B2 | 1/2020 | Blume |
| 10,557,446 B2 | 2/2020 | Stecklein |
| 10,557,576 B2 | 2/2020 | Witkowski |
| 10,557,580 B2 | 2/2020 | Mendyk |
| 10,563,494 B2 | 2/2020 | Graham |
| 10,563,649 B2 | 2/2020 | Zhang |
| 10,570,491 B2 | 2/2020 | Hong |
| 10,576,538 B2 | 3/2020 | Kato |
| 10,577,580 B2 | 3/2020 | Abbas |
| 10,577,850 B2 | 3/2020 | Ozkan |
| 10,591,070 B2 | 3/2020 | Nowell |
| 10,605,374 B2 | 3/2020 | Takaki |
| D880,661 S | 4/2020 | Foster et al. |
| D881,958 S | 4/2020 | Han |
| 10,626,856 B2 | 4/2020 | Coldren |
| 10,633,925 B2 | 4/2020 | Panda |
| 10,634,260 B2 | 4/2020 | Said |
| 10,640,854 B2 | 5/2020 | Hu |
| 10,655,623 B2 | 5/2020 | Blume |
| 10,663,071 B2 | 5/2020 | Bayyouk |
| 10,670,013 B2 | 6/2020 | Foster |
| 10,670,153 B2 | 6/2020 | Filipow |
| 10,670,176 B2 | 6/2020 | Byrne |
| 10,677,109 B2 | 6/2020 | Qiao |
| 10,677,240 B2 | 6/2020 | Graham |
| 10,677,365 B2 | 6/2020 | Said |
| 10,711,567 B2 | 7/2020 | Buckley |
| 10,711,754 B2 | 7/2020 | Nelson |
| 10,711,778 B2 | 7/2020 | Buckley |
| 10,718,441 B2 | 7/2020 | Myers |
| D893,684 S | 8/2020 | Matthys |
| 10,731,523 B2 | 8/2020 | Qu |
| 10,731,643 B2 | 8/2020 | DeLeon |
| 10,738,928 B2 | 8/2020 | Arizpe |
| 10,753,490 B2 | 8/2020 | Fuller |
| 10,753,495 B2 | 8/2020 | Bayyouk |
| D895,777 S | 9/2020 | Chase |
| 10,767,520 B1 | 9/2020 | Hattiangadi |
| 10,771,567 B2 | 9/2020 | Sundaresan |
| 10,774,828 B1 | 9/2020 | Smith |
| 10,781,803 B2 | 9/2020 | Kumar |
| 10,787,725 B2 | 9/2020 | Fujieda |
| 10,801,627 B2 | 10/2020 | Warbey |
| 10,808,488 B2 | 10/2020 | Witkowski |
| 10,808,851 B1 | 10/2020 | Surjaatmadja et al. |
| 10,815,988 B2 | 10/2020 | Buckley |
| 10,815,989 B2 | 10/2020 | Naedler et al. |
| 10,830,360 B2 | 11/2020 | Frank |
| 10,837,556 B2 | 11/2020 | Chase et al. |
| 10,851,775 B2 | 12/2020 | Stark |
| 10,865,325 B2 | 12/2020 | Nakao |
| 10,895,325 B2 | 1/2021 | Nowell et al. |
| D910,820 S | 2/2021 | Grassl |
| 10,907,738 B2 | 2/2021 | Nowell |
| 10,914,171 B2 | 2/2021 | Foster |
| 10,914,383 B2 | 2/2021 | Kustermans et al. |
| 10,934,899 B2 | 3/2021 | Hattiangadi |
| 10,941,765 B2 | 3/2021 | Nowell |
| 10,941,866 B2 | 3/2021 | Nowell |
| 10,954,938 B2 | 3/2021 | Stark |
| 10,961,607 B2 | 3/2021 | Oshima |
| 10,962,001 B2 | 3/2021 | Nowell |
| D915,197 S | 4/2021 | Katano |
| D916,240 S | 4/2021 | Nowell |
| 10,968,717 B2 | 4/2021 | Tran |
| 10,988,834 B2 | 4/2021 | Lee |
| 10,989,321 B2 | 4/2021 | Hattiangadi |
| 10,995,738 B2 | 5/2021 | Blume |
| 11,009,016 B2 | 5/2021 | Berend |
| 11,028,662 B2 | 6/2021 | Rhodes |
| 11,041,570 B1 | 6/2021 | Buckley |
| 11,073,144 B1 | 7/2021 | Hurst et al. |
| 11,078,903 B2 | 8/2021 | Nowell |
| 11,104,981 B2 | 8/2021 | Chen |
| 11,105,185 B2 | 8/2021 | Spencer |
| 11,105,327 B2 | 8/2021 | Hurst |
| 11,105,328 B2 | 8/2021 | Bryne |
| 11,105,428 B2 | 8/2021 | Warbey |
| 11,111,915 B2 | 9/2021 | Bayyouk |
| 11,131,397 B2 | 9/2021 | Yan |
| D933,104 S | 10/2021 | Ellisor |
| D933,105 S | 10/2021 | Ellisor |
| D933,106 S | 10/2021 | Mullins |
| D933,107 S | 10/2021 | Mullins |
| 11,149,514 B2 | 10/2021 | Witkowski |
| 11,149,856 B2 | 10/2021 | Mattoni et al. |
| 11,156,221 B2 | 10/2021 | Stark et al. |
| 11,162,859 B2 | 11/2021 | Lei |
| 11,181,101 B2 | 11/2021 | Byrne |
| 11,181,108 B2 | 11/2021 | Brooks |
| 11,225,963 B2 | 1/2022 | Naedler et al. |
| 11,231,111 B2 | 1/2022 | Hurst |
| 11,242,849 B1 | 2/2022 | Smith |
| D949,202 S | 4/2022 | Sharpstone |
| 11,300,111 B2 | 4/2022 | Thomas et al. |
| 11,333,249 B2 | 5/2022 | Jones et al. |
| 11,353,117 B1 | 6/2022 | Smith |
| 11,359,615 B2 | 6/2022 | Thomas et al. |
| 11,384,756 B1 | 7/2022 | Smith |
| 11,391,374 B1 | 7/2022 | Ellisor |
| 11,421,679 B1 | 8/2022 | Mullins |
| 11,421,680 B1 | 8/2022 | Smith |
| 11,434,714 B2 | 9/2022 | Machocki |
| 11,434,900 B1 | 9/2022 | Alex |
| 11,441,683 B2 | 9/2022 | Mullins et al. |
| 11,454,321 B2 | 9/2022 | Mullins et al. |
| 11,473,686 B2 | 10/2022 | Bayyouk |
| 11,566,713 B2 | 1/2023 | Poremski |
| D980,876 S | 3/2023 | Smith |
| 11,608,896 B2 | 3/2023 | Al-Darra |
| D986,928 S | 5/2023 | Smith et al. |
| 11,692,544 B2 | 7/2023 | Chase |
| D997,992 S | 9/2023 | Smith et al. |
| 11,746,778 B2 | 9/2023 | Bayyouk |
| 11,761,441 B1 | 9/2023 | Alex et al. |
| D1,006,059 S | 11/2023 | Waniek |
| 11,846,356 B1 | 12/2023 | Ellisor |
| 11,891,988 B2 | 2/2024 | Mullins et al. |
| 11,920,684 B2 | 3/2024 | Xu et al. |
| D1,022,145 S | 4/2024 | Meyers |
| D1,031,952 S | 6/2024 | Huntley |
| D1,036,632 S | 7/2024 | Suzuki |
| 12,038,086 B2 | 7/2024 | Shuck |
| 12,049,889 B2 | 7/2024 | Ellisor et al. |
| D1,039,657 S | 8/2024 | Cox |
| 12,055,221 B2 | 8/2024 | Ellisor et al. |

(56) References Cited

U.S. PATENT DOCUMENTS

| | | |
|---|---|---|
| 12,092,226 B2 * | 9/2024 | Elliott ............... F16K 25/005 |
| 12,140,240 B1 | 11/2024 | Xu |
| D1,061,623 S | 2/2025 | Newberg et al. |
| D1,063,005 S | 2/2025 | Lorkowski |
| 12,247,557 B2 | 3/2025 | Avey et al. |
| 12,247,561 B2 | 3/2025 | Avey et al. |
| 12,270,394 B2 | 4/2025 | Ellisor et al. |
| 12,292,120 B1 | 5/2025 | Mullins et al. |
| 12,292,121 B2 | 5/2025 | Berryhill |
| 12,297,922 B1 | 5/2025 | Xu |
| 12,345,253 B2 | 7/2025 | Mullins et al. |
| 12,345,332 B2 | 7/2025 | Ellisor |
| 12,366,244 B2 | 7/2025 | Alex et al. |
| 12,366,245 B1 | 7/2025 | Ellisor et al. |
| 12,404,931 B2 | 9/2025 | Ellisor et al. |
| 2002/0084004 A1 | 7/2002 | Takahashi |
| 2002/0124961 A1 | 9/2002 | Porter |
| 2002/0159914 A1 | 10/2002 | Yeh |
| 2003/0205864 A1 | 11/2003 | Dietle |
| 2003/0233910 A1 | 12/2003 | Jeong |
| 2004/0161351 A1 | 8/2004 | Forrest |
| 2004/0170507 A1 | 9/2004 | Vicars |
| 2004/0194576 A1 | 10/2004 | Ando |
| 2004/0234404 A1 | 11/2004 | Vicars |
| 2004/0255410 A1 | 12/2004 | Schonewille |
| 2004/0258557 A1 | 12/2004 | Shun |
| 2005/0095156 A1 | 5/2005 | Wolters |
| 2005/0098963 A1 | 5/2005 | Olsen |
| 2005/0200081 A1 | 9/2005 | Stanton |
| 2005/0226754 A1 | 10/2005 | Orr |
| 2006/0002806 A1 | 1/2006 | Baxter |
| 2006/0027779 A1 | 2/2006 | McGuire |
| 2006/0045782 A1 | 3/2006 | Kretzinger |
| 2007/0086910 A1 | 4/2007 | Liang |
| 2007/0154342 A1 | 7/2007 | Tu |
| 2007/0261746 A1 | 11/2007 | Nomichi et al. |
| 2007/0273105 A1 | 11/2007 | Stanton |
| 2007/0295411 A1 | 12/2007 | Schwegman |
| 2008/0031769 A1 | 2/2008 | Yeh |
| 2008/0042369 A1 | 2/2008 | Krywitsky et al. |
| 2008/0052014 A1 | 2/2008 | Toyosada |
| 2008/0092384 A1 | 4/2008 | Schaake |
| 2008/0240949 A1 | 10/2008 | Tackett et al. |
| 2008/0279706 A1 | 11/2008 | Gambier |
| 2009/0041611 A1 | 2/2009 | Sathian |
| 2009/0166980 A1 | 7/2009 | Miller et al. |
| 2009/0261575 A1 | 10/2009 | Bull |
| 2009/0278069 A1 | 11/2009 | Blanco |
| 2010/0143163 A1 | 6/2010 | Patel et al. |
| 2010/0230628 A1 | 9/2010 | Stefina |
| 2010/0272597 A1 | 10/2010 | Qiao |
| 2011/0079302 A1 | 4/2011 | Hawes |
| 2011/0142701 A1 | 6/2011 | Small |
| 2011/0189040 A1 | 8/2011 | Vicars |
| 2011/0255993 A1 | 10/2011 | Ochoa |
| 2011/0266752 A1 | 11/2011 | Kocurek |
| 2011/0296982 A1 | 12/2011 | Dille et al. |
| 2012/0141308 A1 | 6/2012 | Saini |
| 2012/0157786 A1 | 6/2012 | Pribanic |
| 2012/0163969 A1 | 6/2012 | Ongole |
| 2012/0259593 A1 | 10/2012 | El-Zein |
| 2012/0304821 A1 | 12/2012 | Ando |
| 2013/0020521 A1 | 1/2013 | Byrne |
| 2013/0037739 A1 | 2/2013 | Millard |
| 2013/0202457 A1 | 8/2013 | Bayyouk |
| 2013/0202458 A1 | 8/2013 | Byrne |
| 2013/0263932 A1 | 10/2013 | Baxter et al. |
| 2013/0319220 A1 | 12/2013 | Luharuka |
| 2014/0083541 A1 | 3/2014 | Chandrasekaran |
| 2014/0083547 A1 | 3/2014 | Hwang |
| 2014/0196883 A1 | 7/2014 | Artherholt |
| 2014/0260954 A1 | 9/2014 | Young |
| 2014/0286805 A1 | 9/2014 | Dyer |
| 2014/0319780 A1 | 10/2014 | Vertenten |
| 2014/0322034 A1 | 10/2014 | Bayyouk |
| 2014/0322050 A1 | 10/2014 | Marette et al. |
| 2014/0348677 A1 | 11/2014 | Moeller |
| 2015/0127308 A1 | 5/2015 | Thomas, Jr. et al. |
| 2015/0132157 A1 | 5/2015 | Whaley |
| 2015/0144826 A1 | 5/2015 | Bayyouk |
| 2015/0147194 A1 | 5/2015 | Foote |
| 2015/0219096 A1 | 8/2015 | Jain |
| 2015/0300332 A1 | 10/2015 | Kotapish |
| 2015/0368775 A1 | 12/2015 | Baker |
| 2016/0201169 A1 | 7/2016 | Vecchio |
| 2016/0215588 A1 | 7/2016 | Belshan |
| 2016/0238156 A1 | 8/2016 | Hubenschmidt |
| 2016/0245280 A1 | 8/2016 | Todorov |
| 2016/0258433 A1 | 9/2016 | Belshan et al. |
| 2016/0319626 A1 | 11/2016 | Dille |
| 2016/0319805 A1 | 11/2016 | Dille |
| 2016/0327165 A1 | 11/2016 | Sundararajan |
| 2017/0051738 A1 | 2/2017 | Horning |
| 2017/0067459 A1 | 3/2017 | Bayyouk |
| 2017/0089334 A1 | 3/2017 | Jahnke |
| 2017/0089470 A1 | 3/2017 | Filipow et al. |
| 2017/0089473 A1 | 3/2017 | Nowell |
| 2017/0097107 A1 | 4/2017 | Hotz |
| 2017/0102101 A1 | 4/2017 | Duval-Arnould |
| 2017/0122055 A1 | 5/2017 | Embury |
| 2017/0159655 A1 | 6/2017 | Morreale |
| 2017/0175799 A1 | 6/2017 | Arnold |
| 2017/0204852 A1 | 7/2017 | Barnett, Jr. |
| 2017/0218951 A1 | 8/2017 | Graham |
| 2017/0218993 A1 | 8/2017 | Freed |
| 2017/0268674 A1 | 9/2017 | Barbera et al. |
| 2017/0297149 A1 | 10/2017 | Shinohara |
| 2017/0298932 A1 | 10/2017 | Wagner |
| 2017/0314097 A1 | 11/2017 | Hong |
| 2017/0342776 A1 | 11/2017 | Bullock |
| 2017/0342976 A1 | 11/2017 | Reddy |
| 2018/0017173 A1 | 1/2018 | Nowell |
| 2018/0058431 A1 | 3/2018 | Blume |
| 2018/0073653 A1 | 3/2018 | Bayyouk |
| 2018/0202434 A1 | 7/2018 | Barnhouse, Jr |
| 2018/0298894 A1 | 10/2018 | Wagner |
| 2018/0312946 A1 | 11/2018 | Gigliotti, Jr |
| 2018/0320258 A1 | 11/2018 | Stewart |
| 2018/0340245 A1 | 11/2018 | Kernion |
| 2018/0354081 A1 | 12/2018 | Kalyani |
| 2019/0011051 A1 | 1/2019 | Yeung |
| 2019/0017503 A1 | 1/2019 | Foster |
| 2019/0024198 A1 | 1/2019 | Hong |
| 2019/0024225 A1 | 1/2019 | Tang |
| 2019/0032685 A1 | 1/2019 | Foster |
| 2019/0032720 A1 | 1/2019 | Bayyouk |
| 2019/0040966 A1 | 2/2019 | Myers et al. |
| 2019/0047049 A1 | 2/2019 | Fujieda |
| 2019/0049052 A1 | 2/2019 | Shuck |
| 2019/0063427 A1 | 2/2019 | Nowell |
| 2019/0063430 A1 | 2/2019 | Byrne |
| 2019/0071755 A1 | 3/2019 | Lee |
| 2019/0072088 A1 | 3/2019 | DeLeon |
| 2019/0072089 A1 | 3/2019 | Buckley |
| 2019/0085806 A1 | 3/2019 | Meibgeier |
| 2019/0085978 A1 | 3/2019 | Chase |
| 2019/0101109 A1 | 4/2019 | Cortes |
| 2019/0107226 A1 | 4/2019 | Bayyouk |
| 2019/0120389 A1 | 4/2019 | Foster |
| 2019/0136842 A1 | 5/2019 | Nowell |
| 2019/0145400 A1 | 5/2019 | Graham |
| 2019/0145568 A1 | 5/2019 | Nick |
| 2019/0154033 A1 | 5/2019 | Brooks |
| 2019/0170137 A1 | 6/2019 | Chase |
| 2019/0170138 A1 | 6/2019 | Bayyouk |
| 2019/0194786 A1 | 6/2019 | Chuang |
| 2019/0226058 A1 | 7/2019 | Fujieda |
| 2019/0226476 A1 | 7/2019 | Stark et al. |
| 2019/0242373 A1 | 8/2019 | Wernig |
| 2019/0247957 A1 | 8/2019 | Stribling |
| 2019/0264683 A1 | 8/2019 | Smith |
| 2019/0292633 A1 | 9/2019 | Porret |
| 2019/0301314 A1 | 10/2019 | Kamo |
| 2019/0301447 A1 | 10/2019 | Skurdalsvold |

(56) References Cited

U.S. PATENT DOCUMENTS

| | | |
|---|---|---|
| 2019/0316685 A1 | 10/2019 | Wang |
| 2019/0331245 A1 | 10/2019 | Gable et al. |
| 2019/0360483 A1 | 11/2019 | Nowell |
| 2019/0368614 A1 | 12/2019 | Hurst |
| 2019/0376508 A1 | 12/2019 | Wagner |
| 2020/0023245 A1 | 1/2020 | Story et al. |
| 2020/0056272 A1 | 2/2020 | Hong |
| 2020/0063899 A1 | 2/2020 | Witkowkski |
| 2020/0070034 A1 | 3/2020 | Sukup et al. |
| 2020/0072369 A1 | 3/2020 | Singley et al. |
| 2020/0080660 A1 | 3/2020 | Dyer |
| 2020/0080661 A1 | 3/2020 | Mullins |
| 2020/0132195 A1 | 4/2020 | Coombs |
| 2020/0157663 A1 | 5/2020 | Yang |
| 2020/0158123 A1 | 5/2020 | Chen |
| 2020/0173317 A1 | 6/2020 | Keating |
| 2020/0208776 A1 | 7/2020 | Bayyouk |
| 2020/0217424 A1 | 7/2020 | Rasmussen |
| 2020/0232455 A1 | 7/2020 | Blume |
| 2020/0240531 A1 | 7/2020 | Nowell |
| 2020/0256149 A1 | 8/2020 | Witkowski |
| 2020/0284253 A1 | 9/2020 | Foster |
| 2020/0284365 A1 | 9/2020 | Bayyouk |
| 2020/0290118 A1 | 9/2020 | Chen |
| 2020/0291731 A1 | 9/2020 | Haiderer |
| 2020/0300240 A1 | 9/2020 | Nowell |
| 2020/0300367 A1 | 9/2020 | Caglio et al. |
| 2020/0308683 A1 | 10/2020 | Xue |
| 2020/0347843 A1 | 11/2020 | Mullins |
| 2020/0355182 A1 | 11/2020 | DeLeon |
| 2020/0362970 A1 | 11/2020 | Hurst |
| 2020/0362975 A1 | 11/2020 | Hurst et al. |
| 2020/0392613 A1 | 12/2020 | Won |
| 2020/0393054 A1 | 12/2020 | Fuller |
| 2020/0399979 A1 | 12/2020 | Webster |
| 2020/0400003 A1 | 12/2020 | Webster |
| 2020/0400130 A1 | 12/2020 | Poehls |
| 2020/0400132 A1 | 12/2020 | Kumar |
| 2020/0400140 A1 | 12/2020 | Bayyouk |
| 2020/0400234 A1 | 12/2020 | Mullins et al. |
| 2020/0400242 A1 | 12/2020 | Spencer |
| 2021/0010113 A1 | 1/2021 | Qiao |
| 2021/0010470 A1 | 1/2021 | Blume |
| 2021/0017830 A1 | 1/2021 | Witkowski |
| 2021/0017982 A1 | 1/2021 | Bayyouk |
| 2021/0017983 A1 | 1/2021 | Myers |
| 2021/0025497 A1 | 1/2021 | Tsuji |
| 2021/0040836 A1 | 2/2021 | Baskin |
| 2021/0054486 A1 | 2/2021 | Kim |
| 2021/0062944 A1 | 3/2021 | Lee |
| 2021/0102630 A1 | 4/2021 | Nowell |
| 2021/0108734 A1 | 4/2021 | Nowell |
| 2021/0130936 A1 | 5/2021 | Wu |
| 2021/0146397 A1 | 5/2021 | Mittag et al. |
| 2021/0148471 A1 | 5/2021 | Murugesan |
| 2021/0180156 A1 | 6/2021 | Kim |
| 2021/0190053 A1 | 6/2021 | Wagner |
| 2021/0190223 A1 | 6/2021 | Bayyouk |
| 2021/0197524 A1 | 7/2021 | Maroli |
| 2021/0215071 A1 | 7/2021 | Oikawa |
| 2021/0215154 A1 | 7/2021 | Nowell |
| 2021/0222690 A1 | 7/2021 | Beisel |
| 2021/0230987 A1 | 7/2021 | Tanner |
| 2021/0239111 A1 | 8/2021 | Zitting |
| 2021/0246537 A1 | 8/2021 | Maroli |
| 2021/0260704 A1 | 8/2021 | Hu |
| 2021/0270261 A1 | 9/2021 | Zhang |
| 2021/0285551 A1 | 9/2021 | Renollett |
| 2021/0310484 A1 | 10/2021 | Myers |
| 2021/0381504 A1 | 12/2021 | Wagner |
| 2021/0381615 A1 | 12/2021 | Riedel |
| 2021/0388832 A1 | 12/2021 | Byrne |
| 2022/0026326 A1 | 1/2022 | Wang |
| 2022/0034402 A1 | 2/2022 | Kiani |
| 2022/0056906 A1 | 2/2022 | Lawson et al. |
| 2022/0065063 A1 | 3/2022 | Xu et al. |
| 2022/0163031 A1 | 5/2022 | Chase |
| 2022/0163032 A1 | 5/2022 | Chase |
| 2022/0163118 A1 | 5/2022 | Maffezzoli et al. |
| 2022/0243723 A1 | 8/2022 | Herold et al. |
| 2022/0282719 A1 | 9/2022 | Barnhouse |
| 2022/0320790 A1 | 10/2022 | Demaratos |
| 2022/0349472 A1 | 11/2022 | Ellisor |
| 2022/0390055 A1 | 12/2022 | Ellisor |
| 2022/0403839 A1 | 12/2022 | Mullins |
| 2023/0041201 A1 | 2/2023 | Myers et al. |
| 2023/0129538 A1 | 4/2023 | Miller et al. |
| 2023/0130824 A1 | 4/2023 | Belshan et al. |
| 2023/0184241 A1 | 6/2023 | Avey et al. |
| 2023/0220840 A1 | 7/2023 | Avey et al. |
| 2023/0258175 A1 | 8/2023 | Figgs et al. |
| 2023/0279991 A1 | 9/2023 | Avey et al. |
| 2023/0332596 A1 | 10/2023 | Chase |
| 2023/0383743 A1 | 11/2023 | Brock et al. |
| 2023/0383859 A1 | 11/2023 | Wiegand et al. |
| 2023/0407864 A1 | 12/2023 | Alex et al. |
| 2024/0042627 A1 | 2/2024 | Wang et al. |
| 2024/0102460 A1 | 3/2024 | Kachovskiy et al. |
| 2024/0117882 A1 | 4/2024 | Ellisor |
| 2024/0200656 A1 | 6/2024 | Avey |
| 2024/0200666 A1 | 6/2024 | Leake |
| 2024/0209945 A1 | 6/2024 | Prate et al. |
| 2024/0262067 A1 | 8/2024 | Iversen et al. |
| 2024/0309724 A1 | 9/2024 | Miller et al. |
| 2024/0369139 A1 | 11/2024 | Ellisor |
| 2024/0376892 A1 | 11/2024 | Ellisor |
| 2024/0376984 A1 | 11/2024 | Ellisor |
| 2024/0384795 A1 | 11/2024 | Barnett et al. |
| 2024/0418164 A1 | 12/2024 | Peer |
| 2025/0027486 A1 | 1/2025 | Alex et al. |
| 2025/0052325 A1 | 2/2025 | Berryhill |
| 2025/0237308 A1 | 7/2025 | Ellisor |
| 2025/0251044 A1 | 8/2025 | Berryhill |
| 2025/0277487 A1 | 9/2025 | Ellisor et al. |
| 2025/0283463 A1 | 9/2025 | Mullins et al. |
| 2025/0283464 A1 | 9/2025 | Ellisor et al. |
| 2025/0305586 A1 | 10/2025 | Mullins et al. |

FOREIGN PATENT DOCUMENTS

| | | |
|---|---|---|
| CN | 102748483 | 10/2012 |
| CN | 202545162 U | 11/2012 |
| CN | 203257342 U | 10/2013 |
| CN | 204040978 U | 12/2014 |
| CN | 104329464 A | 2/2015 |
| CN | 204738957 U | 11/2015 |
| CN | 205315253 U | 6/2016 |
| CN | 109458326 A | 3/2019 |
| CN | 209261799 U | 8/2019 |
| CN | 110374522 A | 10/2019 |
| CN | 209469613 U | 10/2019 |
| CN | 111005695 A | 4/2020 |
| CN | 111073186 A | 4/2020 |
| CN | 102410194 | 4/2021 |
| DE | 3126421 | 1/1983 |
| DE | 102009001560 A1 | 9/2010 |
| DE | 202012104058 U1 | 3/2014 |
| EP | 0 414 955 | 3/1991 |
| EP | 0520567 A1 | 12/1992 |
| EP | 3336356 A1 | 6/2018 |
| EP | 3696408 A1 | 8/2020 |
| GB | 2123100 | 1/1986 |
| GB | 2240592 | 8/1991 |
| JP | 2021025560 A | 2/2021 |
| WO | 2016/024939 | 2/2016 |
| WO | 2021195572 | 9/2021 |
| WO | 2022167341 A1 | 8/2022 |

(56) References Cited

FOREIGN PATENT DOCUMENTS

| | | |
|---|---|---|
| WO | 2024026432 | 2/2024 |
| WO | 2024076786 A1 | 4/2024 |

OTHER PUBLICATIONS

Weir Oil & Gas, "SPM Well Service Pumps & Flow Control Products TWS600S Fluid End Operation Instruction and Service Manual," Feb. 27, 2017, https://www.global.weir/assets/files/oil%20and%20gas%20ebrochures/manuals/tws600s-fluid-end-2p121260.pdf, 41 pages.

White Star Pump Co., "Maintenance Manual: Triplex Pump WS-1300/1600," 2005, http://www.whitestarpump.com/ES/docs/user_t.pdf, 45 pages.

KerrPumps, "Super Stainless Steel Better Than The Best," http://kerrpumps.com/superstainless?gclid=EAIaIQobChMIg470482q6wIViITICh2XPA-qEAAYASAAEgKrxPD_BWE, 2013, last accessed: Aug. 21, 2020, 6 pages.

KerrPumps, "Frac One Pumps—Fluid End—Fracing," http://kerrpumps.com/fracone, 2013, last accessed: Aug. 21, 2020, 3 pages.

KerrPumps, "KerrPumps—Frac Pump & Mud Pump Fluid End—Fluid End Pump," http://kerrpumps.com/fluidends, 2013, last accessed: Aug. 21, 2020, 6 pages.

Vulcan Industrial, "Vulcan," http://www.vulcanindustrial.com/, 2019, last accessed: Aug. 21, 2020, 3 pages.

Vulcan Industrial, "Vulcan," http://www.vulcanindustrial.com/fluid-ends/, 2019, last accessed: Aug. 21, 2020, 3 pages.

Covert Manufacturing, Inc., "Fluid End Block: Covert Manufacturing", (site visited Jul. 30, 2021), covertmfg.com, URL: <http://www.covertmfg.com/our-capabilities/fluid-end-block/> (Year: 2021).

Kerr Pumps, "the most advanced fluid ends", (site visited Aug. 5, 2021), Kerrpumps.com, URL: <http://kerrpumps.com/ fluidends> (Year: 2021).

Shandong Baorun, 2250 Triplex Plunger Pump Fluid End Exchangeable with Spm, (site visited Aug. 5, 2021), made-in-china.com, URL: < https://sdbaorun.en.made-in-china.com/product/wNixIDXYrshL/China-2250-Triplex-Plunger-Pump-Fluid-End-Exchangeable-with-Spm.html> (Year: 2021).

John Miller, "The Reciprocating Pump, Theory, Design and Use," 1995, 2nd Edition, Krieger Publishing Company, Malabar, Florida, 1 page.

"QIH-1000 Hp Quintuplex," Dixie Iron Works, 2017, https://web.archive.org/web/20171031221150/http:/www. diwmsi.com/pumping/qi-1000/.

Technical Manual MSI Hybrid Well Service Pump Triplex and Quintuplex Models, Dixie Iron Works, Mar. 12, 2019, 88 pages. https://www.diwmsi.com/pumping/qi-1000/.

Carpenter, "CarTech Ferrium C61 Data Sheet," 2015, 2 pages.

The American Heritage Dictionary, Second College Edition, 1982, 6 pages.

Matthew Bultman, "Judge in West Texas Patent Hot Spot Issues Revised Guidelines," Sep. 23, 2020, Bloomberg Law News, 3 pages.

David L. Taylor, "Machine Trades Blueprint Reading: Second Edition," 2005, 3 pages.

Blume, U.S. Pat. No. 6,544,012, issued Apr. 8, 2003, Fig. 12A.

Caterpillar, "Cat Fluid Ends For Well Stimulation Pumps," 2015, 2 pages.

Claim Chart for U.S. Pat. No. 6,544,012, 23 pages.
Claim Chart for U.S. Pat. No. 7, 186,097, 22 pages.
Claim Chart for U.S. Pat. No. 7,845,413, 8 pages.
Claim Chart for U.S. Pat. No. 9,534,472, 8 pages.
Claim Chart for U.S. Pat. Pub. No. 2013/0319220, 17 pages.
Claim Chart for U.S. Pat. Pub. No. 2014/0348677, 10 pages.
Claim Chart for U.S. Pat. Pub. No. 2015/0132157, 23 pages.
Claim Chart for "GD-3000," 9 pages.
Claim Chart for "NOV-267Q," 14 pages.

Collins English Dictionary, "annular," https://www.collinsdictionary.com/us/dictionary/english/annular, 2021, 4 pages.

Collins English Dictionary, "circumference," https://www.collinsdictionary.com/us/dictionary/english/circumference, 2021, 7 pages.

Collins English Dictionary, "plug," https://www.collinsdictionary.com/us/dictionary/english/plug, 2021, 17 pages.

Collins English Dictionary, "profile," https://www.collinsdictionary.com/us/dictionary/english/profile, 2021, 10 pages.

Collins English Dictionary, "sleeve," "therethrough," "through," "tube," and "tubular," 8 pages.

Collins English Dictionary, "space," https://www.collinsdictionary.com/us/dictionary/english/space, 2021, 13 pages.

Collins English Dictionary, "stairstep," https://www.collinsdictionary.com/us/dictionary/english/stairstep, 2021, 3 pages.

Congressional Record—Extensions of Remarks, Apr. 18, 2007, pp. E773-E775.

Congressional Record, Mar. 7, 2011, 31 pages.

"Declaration of Steven M. Tipton, Ph.D., P.E., Submitted with Patent Owner's Preliminary Response," Sep. 11, 2020, 155 pages.

"Declaration of William D. Marscher, P.E.—U.S. Pat. No. 10,914,171," Feb. 11, 2021, 308 pages.

"Declaration of William D. Marscher, P.E.—U.S. Pat. No. 10,591,070," May 25, 2020, 209 pages.

Email dated Sep. 22, 2020 in PGR2020-00065, 3 pages.

Email dated Sep. 25, 2020 in Kerr Machine v Vulcan Industrial Holdings, 1 page.

U.S. Pat. No. 10,288,178, 353 pages.
U.S. Pat. No. 10,519,950, 142 pages.
U.S. Pat. No. 10,591,070, 168 pages.
U.S. Appl. No. 16/722,139, 104 pages.
U.S. Appl. No. 13/773,271, 250 pages.
U.S. Appl. No. 15/719,124, 183 pages.
U.S. Appl. No. 16/814,267, 194 pages.
U.S. Appl. No. 17/120,121, 110 pages.
U.S. Appl. No. 62/234,483, 45 pages.
U.S. Appl. No. 62/315,343, 41 pages.
U.S. Appl. No. 62/318,542, 44 pages.
U.S. Appl. No. 62/346,915, 41 pages.
U.S. Appl. No. 62/379,462, 24 pages.

"Flush Free Sealing Benefits," Oct. 3, 2011, http://empoweringpumps.com/flush-free-sealing-benefits/, accessed May 9, 2020, 5 pages.

Gardner Denver, Well Servicing Pump Model GD-3000—Operating and Service Manual, Apr. 2011, 44 pages.

Gardner Denver, Well Servicing Pump Model GD-1000Q—Fluid End Parts List, Sep. 2011, 24 pages.

Gardner Denver, Well Servicing Pump Model HD-2250—Operating and Service Manual, Jan. 2005, 44 pages.

Gardner Denver, GD 2500Q Hdf Frac & Well Service Pump, 2 pages.

Cutting Tool Engineering, "Groove milling," Aug. 1, 2012, https://www.ctemag.cojm/news/articles/groove-milling, accessed May 13, 2020, 11 pages.

VargusUSA, "Groovex Innovative Grooving Solutions—Groove Milling," Dec. 12, 2011, http://www.youtube.com/watch?v=vrFxHJUXjvk, 68 pages.

Kerr Pumps, Kerr KA-3500B/KA-3500BCB Plunger Pump Parts and Service Manual, 41 pages.

Kerr Pumps, Kerr KD-1250B/KD-1250BCB Plunger Pump Service Manual, 38 pages.

Kerr Pumps, Kerr KJ-2250B and KJ-2250BCB Plunger Pump Service Manual, 38 pages.

Kerr Pumps, Kerr KM-3250B / KM-3250BCB Plunger Pump Service Manual, 35 pages.

Kerr Pumps, Kerr KP-3300B / KP-3300BCB Plunger Pump Service Manual, 41 pages.

Kerr Pumps, Kerr KT-3350B/BCB KT-3400BCB Plunger Pump Service Manual, 46 pages.

Kerr Pumps, Kerr triplex pump km3250bcb 10,000 psi @ 5.1 gmp, Feb. 2, 2021, http://imged.com/kerr-triplex-pump-km3250bcb-10-000-psi-5-1-gmp-8234739.html, 2 pages.

(56) References Cited

OTHER PUBLICATIONS

Lex Machina, 77 Federal district court cases for Alan D Albright of W.D. Tex., http://law.lexmachina.com/court/txwd/judge/5198506/cases?status=open&filed_on-from=2020-02-19&filed_on-to=2020-04-19&pending-, 7 pages.
Lex Machina, Motion Metrics Report for 834 orders issued by District Judge Alan D Albright (ADA) in 1,603 cases from the Search for federal district court cases before Judge Alan D Albright, https://law.lexmachina.com/motions/motion_metrics?cases_key=yyix9Y8-k2k, generated on Sep. 23, 2020, 1 page.
Lex Machina, 6:20-cv-00200-ADA, *Kerr Machine Co.* v. *Vulcan Industrial Holdings, LLC* Docket Entries, https://law.lexmachina.com/cases/2004206451#docket-entries, 6 pages.
Jonathan Maes, "Machining Square Inside Corners: Conquer the Nightmare!," accessed Sep. 8, 2020, https://makeitfrommetal.com/machining-square-inside-corners-the-night . . ., 22 pages.
Ross Mackay, "Process Engineering: Properly seal that pump," May 17, 2005, https://www.chemicalprocessing.com/articles/2005/465, 11 pages.
MSI Fluid End Components, https://www.scribd.com/document/421304589/Fluid-End, 1 page.
MSI Dixie Iron Works, Ltd., Msi QI-1000 Technical Manual for 1000 HP Quintuplex Msi QI-1000 Pump, Feb. 21, 2004, 90 pages.
MSI, Product Listing and Pricing, accessed Mar. 8, 2016, 19 pages.
National Oilwell Varco, 267Q-6M Quinuplex Plunger Pump: Parts List, Jul. 21, 2008, 13 pages.
Oil and Gas Well Servicing, Audit Procedures for Oil and Gas Well Servicing, May 2010, Texas Comptroller of Public Accounts, Audit Division, 68 pages.
Tony Atkins and Marcel Escudier, Oxford Dictionary of Mechanical Engineering, Oxford University Press, 2013, 10 pages.
Parker Hannifin Corporation and Autoclave Engineers, Technical Information, 2016, 16 pages.
Girdhar, Moniz and Mackay, "Chapter 5.4 Centrifugal pump design," Plant and Process Engineering 360, 2010, pp. 519-536.
Parker Hannifin Corporation, PolyPak Seals for Hydraulic Applications Catalog EPS 5370_PolyPak, 2015, 38 pages.
Paresh Girdhar and Octo Moniz, "Practical Centrifugal Pumps—Design. Operation and Maintenance," Newnes, 2005, 33 pages.
Reinhard Preiss, "Stress concentration factors of flat end to cylindrical shell connection with a fillet or stress relief groove subjected to internal pressure," 1997, Int. J. Pres. Ves. & Piping, vol. 73, pp. 183-190.
Caterpillar, WS255 Quintuplex Well Stimulation Pump, 2 pages.
Gardner Denver Pumps, Redline Series Brochure, 3 pages.
Eaton Aerospace Group, Resilient Metallic Seals, TF100-35D, Oct. 2013, 60 pages.
Scott McKeown, "District Court Trial Dates Tend to Slip After PTAB Discretionary Denials—Patents Post-Grant," Jul. 24, 2020, Ropes & Gray, accessed Sep. 23, 2020, 3 pages.
Ricky Smith and R. Keith Mobley, "Rules of Thumb for Maintenance and Reliability Engineers—Chapter 14: Packing and Seals," Elsevier, 2008, pp. 239-250.
Schlumberger, Jet Manual 02—Reciprocating Pumps, Aug. 7, 2015, 63 pages.
Schlumberger, Treating Equipment Manual: Fluid Ends, Section 10, Apr. 2000, 87 pages.
SPM Oil & Gas, SPM QEM 3000 Frac Pump, 2021, 4 pages.
Supplemental Declaration of Steven M. Tipton, Ph.D., P.E.—Case PGR2020-00065, U.S. Pat. No. 10,591,070, Mar. 2, 2021, 35 pages.
Servagroup, TPD 600 Triplex Pump Brochure, Mar. 24, 2011, 2 pages.
Utex Industries, Inc., Well Service Products Catalog, Jun. 2017, 51 pages.
Utex Industries, Inc., Well Service Packing—Packing Assemblies Complete & Replacement, May 2013, 40 pages.
Vargus Ltd., Groove Milling High Precision Tools for Groove Milling, Dec. 2012, pp. 2-22.
Vulcan, High-Impact Replacement Parts, Fortified Valves and Seats, found at: https://www.vulcanindustrial.com/energy-products/replacement-parts.
DiaCom Corporation, "Diaphragm Design Guidebook", 28 pages, 2018.
Declaration of Duncan Hall from Internet Archive/Wayback Machine, Feb. 3, 2021, Kerr Plunger Pump Manuals, 20 pages.
Michael Agnes, Editor, Webster's New World College Dictionary, Fourth Edition, 1999, 5 pages.
Weir SPM Oil & Gas, Grooveless Fluid End, 2008, 1 page.
Weir SPM Oil & Gas, Weir SPM General Catalog, 2009, 40 pages.
Weir SPM Oil & Gas, Well Service Pump Reference Guide, 2008, 55 pages.
*Intellectual Ventures I LLC* v *VMWare, Inc.*, Case No. 1:19-CV-01075-ADA, Document 91 (W.D. Tex Jun. 3, 2020), Defendant VMWare, Inc.'s Stipulation of Invalidity Contentions for U.S. Pat. No. 7,949,752, Jun. 3, 2020, 5 pages.
*Vulcan Industrial Holding, LLC et al.* v. *Kerr Machine Co.* Case No. 4:21-cv-433, Document 1, Complaint for Declaratory Judgment of Patent Non-Infringement, Feb. 9, 2021, 17 pages.
*Trilogy Enterprises, Inc.*, v. *Trilogy Education Services, LLC*, Case. No. 6: 19-cv-199-ADA-JCM, Document 35, Fifth Amended Scheduling Order, Sep. 8, 2020, 4 pages.
*Dr. Corneliu Bolbocean* v *Baylor University*, Case No. 6:19-CV-00465-ADA-JCM, Document 34, Scheduling Order, Apr. 6, 2020, 4 pages.
*Kerr Machine Co.*, v *Vulcan Energy Services, LLC, Vulcan Industrial Holdings, LLC, and Cizion, LLC d/b/a/ Vulcan Industrial Manufacturing*, Case No. 6:21-CV-00044-ADA, Document 4, Plaintiff's Amended Complaint for Patent Infringement and Jury Demand, Jan. 19, 2021, 30 pages.
*Kerr Machine Co.*, v *Vulcan Energy Services, LLC, Vulcan Industrial Holdings, LLC, and Cizion, LLC d/b/a/ Vulcan Industrial Manufacturing*, Case No. 6:21-CV-00044, Document 1, Plaintiff's Original Complaint for Patent Infringement and Jury Demand, Jan. 19, 2021, 47 pages.
*Kerr Machine Co.*, v *Vulcan Energy Services, LLC, Vulcan Industrial Holdings, LLC, and Cizion, LLC d/b/a/ Vulcan Industrial Manufacturing*, Case No. 6:21-CV-00044-ADA, Document 10, Plaintiff's Second Amended Complaint for Patent Infringement and Jury Demand, Feb. 1, 2021, 88 pages.
*Kerr Machine Co.*, v *Vulcan Industrial Holdings, LLC, Vulcan Energy Services, LLC, Cizion, LLC*, Case No. W-20-CV-00200-ADA-24, Order Setting Trial Date, Jun. 14, 2020, 1 page.
*Kerr Machine Co.*, v *Vulcan Industrial Holdings, LLC, Vulcan Energy Services, LLC, Cizion, LLC*, Case No. W-20-CV-00200-ADA-29, Order Setting Trial Date, Aug. 2, 2020, 1 page.
*Kerr Machine Co.*, v. *Vulcan Industrial Holdings, LLC*, Case. No. 6:20-CV-00200-ADA, Affidavit of Service, Apr. 7, 2020, 1 page.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Plaintiff's First Amended Complaint for Patent Infringement and Jury Demand, Jun. 4, 2020, 11 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 26, Defendant Cizion, LLC d/b/a Vulcan Industrial Manufacturing, LLC's Motion to Dismiss or Transfer, Jul. 22, 2020, 10 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Opposed Motion to Stay Litigation Pending the Outcome of the Pending Post-Grant Review Proceeding Before the Patent Trial and Appeal Board, Jul. 31, 2020, 14 pages.
*Kerr Machine Co.*, v *Vulcan Industrial Holdings, LLC*, Case No. 6:20-CV-00200-ADA, Plaintiff's Preliminary Infringement Contentions, May 22, 2020, 50 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Preliminary Invalidity Contentions, Aug. 13, 2020, 29 pages.

(56) References Cited

OTHER PUBLICATIONS

*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 34, Scheduling Order, Aug. 11, 2020, 3 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 38, Plaintiff's Second Amended Complaint for Patent Infringement and Jury Demand, Sep. 25, 2020, 11 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 5, Standing Order regarding Scheduled Hearings in Civil Cases in Light of Chief Judge Garcia's 24 Amended Order, Mar. 24, 2020, 4 pages.
*Kerr Machine Co., v Vulcan Industrial Holdings, LLC, Vulcan Energy Services, LLC, and Cizion, LLC d/b/a/ Vulcan Industrial Manufacturing*, Civil Docket for Case No. 6:20-cv-00200-ADA, accessed Sep. 11, 2020, 7 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 54, Claim Construction Order, Dec. 3, 2020, 3 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Docket Entry, Aug. 2, 2020, 1 page.
*Kerr Machine Co., v Vulcan Industrial Holdings, LLC*, Case No. 6:20-CV-00200, Document 1, Plaintiff's Original Complaint for Patent Infringement and Jury Demand, Mar. 19, 2020, 39 pages.
*Adriana del Rocio Barberena-Rovira, et al., v Kuiper Dairy, LLC, et al.*, Case No. 6:20-CV-00250-ADA-JCM, Document 20, Scheduling Order, Jul. 22, 2020, 4 pages.
*Acquanlan Deonshay Harris v. Cenlar, FSBI*, Case No. 6:20-CV-00271-ADA-JCM, Document 13, Scheduling Order, Aug. 20, 2020, 4 pages.
*Senior Living Properties, LLC c. Ironshore Speciality, Insurance Company*, Case No. 6:20-CV-00282-ADA-JCM, Document 12, Scheduling Order, Jul. 7, 2020, 4 pages.
*Dionne Bracken, Individually and as Next Friend of A.M.B., v Michael D. Ashcraft and Envirovac Waste Transport Systems, Inc.*, Case No. 6:20-CV-00308-ADA-JCM, Document 17, Scheduling Order, Jul. 28, 2020, 4 pages.
*Kendra Coufal v. Roger Lee Thomas and Apple Logistics, Inc.*, Case No. 6:20-CV-00356-ADA-JCM, Document 12, Scheduling Order, Jul. 28, 2020, 4 pages.
*Tipton International, Inc., v. Vetbizcorp, LLC and Samuel Cody*, Case No. 6:20-CV-00554-ADA-JCM, Document 8, Scheduling Order, Aug. 20, 2020, 4 pages.

*Dynaenergetics GmbH & Co. KG and Dynaenergetics US, Inc., v. Hunting Titan, Ltd.; Hunting Titan, Inc.; and Hunting Energy Services, Inc.*, Case No. H-17-3784, Order, Sep. 4, 2020, 2 pages.
Slip Opinion, In re Sand Revolution LLC, Case No. 2020-00145 (Fed. Cir. Sep. 28, 2020), 3 pages.
In re Vulcan Industrial Holdings, LLC, Case No. 2020-00151 (Fed. Cir. Sep. 29, 2020), Petition for Writ of Mandamus, 43 pages.
*Densys Ltd., v. 3Shape Trios A/S and 3Shape A/S*, Case No. Wa: 19-CV-00680-ADA, Document 27, Scheduling Order, Apr. 8, 2020, 4 pages.
*Kerr Machine Co. vs. Vulcan Industrial Holdings, LLC*, Case No. WA:20-CV-00200-ADA, Order Setting Markman Hearing, May 29, 2020, 1 page.
Sur-Lock Liner Retention System—Product Brochure (p. 16) (Year: 2017).
Sur-Lock Liner Retention System—Video (https://premiumoilfield.com/performance-enhancements/sur-lock/sur-lock-liner-retention-system.html) (https://www.youtube.com/watch?v=6NZGeD5NkF8) (Year: 2017).
U.S. Appl. No. 17/241,680 titled "Fluid End and Center Feed Suction Manifold" filed Apr. 27, 2021.
Karolczuk et al., "Application of the Gaussian Process for Fatigue Life Prediction Under Multiaxial Loading", Mechanical Systems and Signal Processing 167 (2022), Nov. 14, 2021.
Carraro et al. "A Damage Based Model for Crack Initiation in Unidirectional Composites Under Multiaxial Cyclic Loading", Composite Science and Technology 99 (2014), 154-163, May 16, 2014.
Albinmousa et al., "Cyclic Axial and Cyclic Torsional Behaviour of Extruded AZ31B Magnesium Alloy", International Journal of Fatigue 33 (2011), 1403-1416, 2011.
Horstemeyer et al., "Universal Material Constants For Multistage Fatigue (MSF) Modeling of the Process-Structure-Property (PSP) Relations of A000, 2000, 5000, and 7000 Series Aluminum Alloys", Integrating Materials and Manufacturing Innovation, vol. 9 (2020), 157-180, Jun. 22, 2020.
Guan et al., "Model Selection, Updating, and Averaging for Probabilistic Fatigue Damage Prognosis", Journal of Structural Safety, Mar. 11, 2011.
Frick et al., "Orientation-Independent Pseudoelasticity in Small-Scale Niti Compression Pillars", Scripta Materialia 59(12), 7-10, 2008.
Naghipour et al., "Fatigue Analysis of Notched Laminates: A Time-Efficient Macro-Mechanical Approach", Ohio Aerospace Institute, Cleveland, 2016.
International Search Report and Written Opinion for international application No. PCT/US2023/066143, mailed Aug. 28, 2023.
International Search Report and Written Opinion for international application No. PCT/US2023/073458, mailed Feb. 1, 2024.

* cited by examiner

GRADIENT MATERIAL STRUCTURES AND METHODS OF FORMING THE SAME

PRIORITY CLAIM

This application is a continuation of U.S. application Ser. No. 18/099,069, filed Jan. 19, 2023, titled "GRADIENT MATERIAL STRUCTURES AND METHODS OF FORMING THE SAME", which claims the benefit of and priority to U.S. Provisional Patent Application No. 63/300,874, filed Jan. 19, 2022, titled "VALVE WITH A GRADIENT SURFACE STRUCTURE," the contents of all of which are incorporated herein by reference in their entireties.

TECHNICAL FIELD

This disclosure generally relates to gradient material structure for use on tools or other components. More particularly, some embodiments of this disclosure relate to gradient material structures for forming a surface on a valve seat used a pump system.

BACKGROUND

Pumping systems may be used in a variety of applications, such as industrial applications where pumping systems are used to elevate a working fluid pressure. One such application is hydraulic fracturing systems, where high pressure pumps are used to increase a fluid pressure of a working fluid (such as fracturing fluid, slurry, etc.) for injection into an underground formation. The working fluid may include particulates, which are injected into fissures of the formation. When the fluid is removed from the formation, the particulates remain and "prop" open the fissures, facilitating flow of oil and gas or other formation fluids. In many applications, reciprocating pumps are used where a fluid is introduced into a fluid end inlet passage and is emitted through an outlet passage. A plunger reciprocates within a bore to add energy to the fluid. Due to the particulates and corrosive nature of the working fluid, sealing surfaces may become eroded or otherwise damaged.

SUMMARY

Applicant has recognized the problems noted above herein and conceived and developed embodiments of systems and methods, according to the present disclosure, for valve seats with improved resistance to wear, cracking, or damage, and in various embodiments, fluid ends containing one or more valve seats. For instance, in some embodiments, a valve seat may have a strike face defined (at least partially) by a gradient material structure that has a continuous compositional change from a first material along the strike face to a second material so as to avoid a sharp mismatch of thermal and/or mechanical properties therein.

Some embodiments disclosed herein are directed to a valve seat for a pumping assembly includes a top portion having a bore extending therethrough, top portion having a strike face, wherein at least a portion of the strike face is formed from a gradient material structure. The valve seat also includes a bottom portion having the bore extending therethrough.

Some embodiments disclosed herein are directed to a structure for a contact surface includes a gradient material structure including a resistant material, wherein a percentage of the resistant material is larger at an exterior surface location than an interior location, the percentage gradually decreasing between the exterior surface location and the interior location.

Some embodiments disclosed herein are directed to a valve seat for a pumping assembly. In some embodiments, the valve seat includes a body including a gradient material structure that defines a strike face for the valve seat. The gradient material structure has a first material, a second material spaced from the first material, and a smooth compositional transition between the first material and the second material. In addition, the valve seat includes a bore extending through the body.

Some embodiments disclosed herein are directed to a structure for a contact surface. In some embodiments, the structure includes a gradient material structure having an exterior surface, the gradient material structure including a gradually decreasing percentage of a resistant material from a first value at the exterior surface to a second value at an interior location.

Some embodiments disclosed herein are directed to a method of forming a valve seat for a pumping assembly. In some embodiments, the method includes forming a gradient material structure having a first material, a second material, and a smooth compositional transition between the first material and the second material. In addition, the method includes bonding the gradient material structure to a core material thereby to define the valve seat, the gradient material structure positioned to define a strike face of the valve seat.

Embodiments described herein include a combination of features and characteristics intended to address various shortcomings associated with certain prior devices, systems, and methods. The foregoing has outlined rather broadly the features and technical characteristics of the some of the disclosed embodiments in order that the detailed description that follows may be better understood. The various characteristics and features described above, as well as others, will be readily apparent to those having ordinary skill in the art upon reading the following detailed description, and by referring to the accompanying drawings. It should be appreciated that this disclosure may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

Figure 1A:
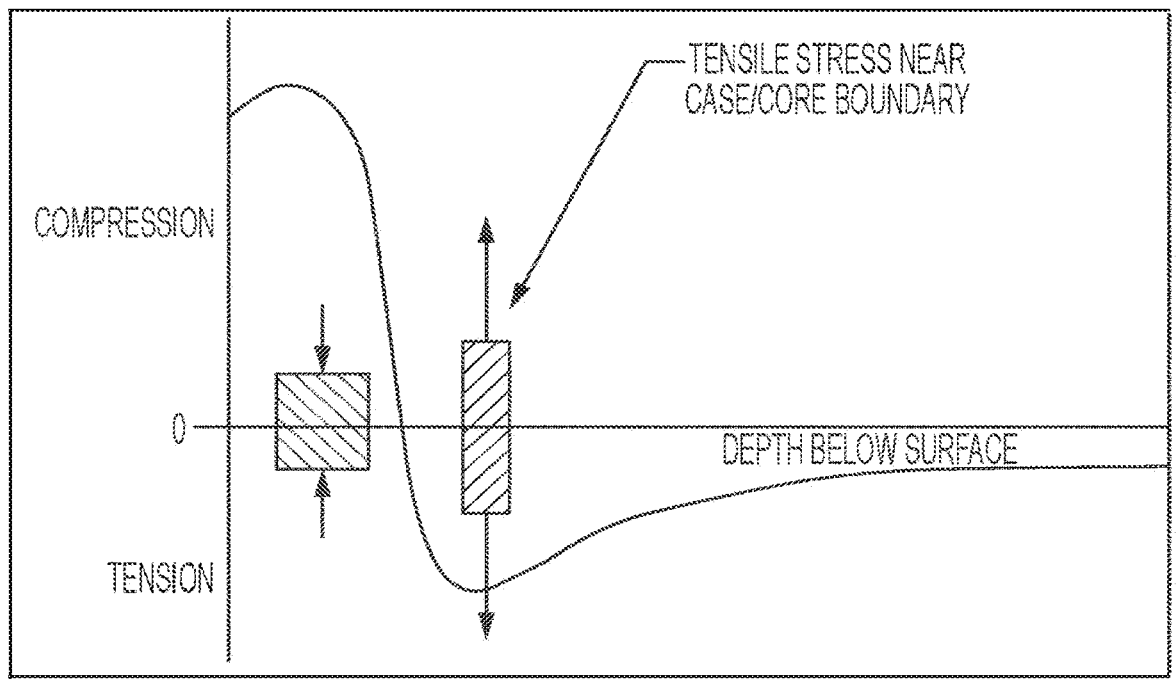
FIG. 1A is a graphical representation of an example of tensile residual stress.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, like reference numerals may be used for like components, but such use is for convenience purposes and not intended to limit the scope of the present disclosure. Moreover, use of terms such as substantially or approximately, when used in relation to a specified value, may refer to +/−10 percent of the specified value.

Embodiments of the present disclosure are directed toward tools or parts that may be subject to dynamic loading along with abrasive and/or corrosive mediums. It should be appreciated that while various embodiments may be described with reference to pumps, such as hydraulic fracturing pumps, that such description is for illustrative purposes only and not intended to limit the scope of the present disclosure. By way of example, systems and methods may be utilized with equipment such as frac pumps, mud pumps, waste water pumps, sand blenders and mixers, earth moving and mining equipment, harvester blades, wind energy turbine blades, and the like. Accordingly, various systems and methods may be incorporated into the formation or repair of various components, such as valves/valve seats, plungers, mixer blades, and the like.

One or more embodiments of the present disclosure may include a gradient material structure with continuous composition changes of high entropy alloy (HEA), high entropy ceramic (HEC), medium entropy alloy (MEA), medium entropy ceramic (MEC), a cermet, or combinations thereof, from an outer surface to a substrate core, as opposed to using two segments of two traditional materials. In at least one embodiment, such materials may be referred to as "resistant materials" due to their resistance to abrasion or cracking. Accordingly, mechanical and thermal properties smoothly transit and match (or are substantially maintained) from the surface into the substrate core to prevent thermal or fatigue cracking that occurs commonly in the traditional hard coating, overlay, or carbide inserts. In at least one embodiment, a gradient composite structure with continuous composition changes and smooth property transitions from surface to the core are utilized to form one or more portions of industrial components. In certain embodiments, the gradient composite structure is a metal matrix composite having a maximum hard reinforcement weight percentage (wt %) on an exterior surface, a gradual reduction of the hard reinforcement wt % to a core composition inwardly (or a core composition positioned at an interior location of the gradient composite structure), and a smooth thermal and mechanical property transition from the exterior surface to core composition.

Valves and valve seats are critical mating parts/tools of a fracture pump system that suctions and discharges high pressure fracture fluid (a pressure greater than the strength of the rock formation, which may be up to approximately 15,000 psi) into gas and oil well to fracture the tight rock formations for oil production. The suction and discharge movement of the hard proppant (such as sands or ceramic particles) loaded fracturing fluids by the pump puts the valves and seats under constant pulsing hydraulic pressure (for example, a cyclic hydraulic pressure between approximately 100 psi to 15,000 psi) and severe abrasive plowing and wear. The fracturing fluids are often corrosive, which further accelerates the failures of the tools. The short lifetime of these consumable parts forces the fracture fleets to constantly shut down the frac pumps and replace the consumables parts, leading to high non-productive time (NPT) and maintenance cost. The traditional material and design solutions to the challenges associated with operation in these severe conditions is using a ductile low carbon steel core combined with a carburized or case-hardened surface layer. These techniques may be successful in less corrosive (such as fresh water), lower hydraulic pressure (<10,000 psi), and less proppant loaded fluid. However, this material has proven ineffective in high pressure, high proppant load, and corrosive produced water fluid and cannot meet operational demands.

More recently, a new concept that includes a ductile medium carbon steel core with hard carbides (such as tungsten carbide (WC) and cobalt (Co)) insert seal faces have attracted the interest of certain manufacturers within the hydraulic fracturing industry. Though the hard carbide inserts increase abrasive resistance of the seat seal faces and extend seat lifetime to some degree, brittle shattering or surface fatigue cracking of the hard surface, along with carbide insert de-bonding from the seat body, has occurred, causing severe erosion and washing out of the associated equipment, such as fluid ends. The root causes attributing to the problems are believed to be that the hard carbides or case-hardened layers are intrinsically brittle with very low fracture toughness, in the range less than 15 MPa(m)^1/2. This low fracture toughness, combined with the sharp mismatch of thermal or mechanical properties, such as thermal expansion coefficient and young's modulus, between the hard-facing layers and steel core, may lead to the failures seen in the industry. Applicant has recognized these problems, identified the causes, and now finds that the industry is in need for better material and design innovations for the next generation valve seats. Applicant has further recognized that such problems may also occur in various other industries facing similar severe operating conditions.

Some embodiments of the present disclosure are directed toward new hard, strong, yet ductile, gradient material structures (GMS), associated gradient compositions, mechanically and thermally gradient microstructures and properties, and one or more processes for making the GMS. Embodiments may be further directed toward uses for a valve seat and/or new valve seat design features introduced by the gradient material structures. Applicant further notes that such materials may also be incorporated into other tool parts under abrasive, corrosive, and dynamic loading conditions.

In at least one embodiment, the GMS material structure includes an HEA, HEC, MEA, MEC, cermet, or combinations thereof. As used herein, HEA may be formed by mixing equally or relatively large proportions of usually five or more elements from the group of the refractory elements including, but not limited to, Tungsten, Vanadium, Niobium, Molybdenum, Tantalum, or transition metal elements Iron, Cobalt, Manganese, Chromium, Nickel. As used herein, HEC may comprise a multicomponent of ceramic oxides, carbide, nitrides, silicides, and borides. The HEAs and HECs have superior hardness and toughness combination with fracture toughness equal to or greater than 60-200 MPa(m)$^{1/2}$ and Vickers hardness equal to or greater than (=>) 800 HV, such as from about 800 HV to about 1400 HV. In contrast, the traditional hard carbides, oxides, or ceramics coatings have fracture toughness in the low range of less than 2-12 MPa(m)$^{1/2}$ and are prone to brittle shattering and cracking.

As will be described herein, various embodiments of the present disclosure are directed toward one or more components, such as valve seats, that include at least an HEA structure with a ductile steel core. In at least one embodiment, the HEA structure has a gradient composition from 100% hard HEA alloys (for example, HV>800), inwardly to 75%, 50%, 25%, and to 100% of steel core. Unlike the traditional hard coatings that have thermal expansion and elastic modulus mismatches to the substrate core material, the gradient HEA structure shows a smooth thermal and mechanical transition of material properties from the valve seat surface to the core, leading to a thermal residual stress and crack free and high adhesion bonding material.

In at least one embodiment, a comparison of the coefficient of thermal expansion (CTE) and the elastic modulus of a gradient material structure according to embodiments of the disclosure and a traditional WC coating on a steel substrate demonstrates that HEA hard-facing according to embodiments of the disclosure has a smooth transition of CTE of $8.84 \times 10^{-6}$/° C. on the outer surface to $12 \times 10^{-6}$/° C. in the substrate core, whereas the traditional WC coating has a sharp increase of CTE at the interface (for example, at around 2 mm in depth) from $2 \times 10^{-6}$/° C. to $13 \times 10^{-6}$/° C. at the substrate core. A similar relationship can be seen for the elastic modulus. CTE and elastic modulus are just two examples of thermal and mechanical properties compared herein. It should be appreciated that there are many other thermal and mechanical properties that show the same smoothness and sharpness of the transitions for the two surface techniques. Applicant has identified that such sharp changes or mismatches in material thermal and mechanical properties of the traditional hard coatings are root causes, and potentially the main root causes, of surface brittleness and cracking of the hard-facing or coating materials under abrasive and dynamic loadings.

Various embodiments may also provide a gradient structure that has a composite structure including a steel matrix with reinforcements. The steel matrix may include, but is not limited to, carbon steel, high strength low alloy steel, tool steel, bearing steel, stainless steel, and their combinations. The reinforcements may include, but are not limited to, ceramics (such as carbides, nitrides, oxides, etc.), cermets, and intermetallic compounds in different forms (such as powders, fibers (short or continuous), nanoparticles, or tubes, etc.).

In at least one embodiment, one or more composite structures include a gradient composition having mechanical and thermal properties with maximum hard reinforcement wt % on an exterior surface with a gradual reduction of the hard reinforcement wt % from a first value at the exterior surface to second value for a core composition positioned at an interior location of the gradient composite. The composition may further include a smooth thermal and mechanical property transition from the exterior surface to the core composition.

In at least one embodiment, one or more methods to process the gradient HEA hard-facing include thermal spraying, vapor deposition, powder metallurgy, brazing, hot isostatic pressing, pressure die forging, 3D printing, laser surface alloying or cladding, and welding. In at least one embodiment, due to the energy sources used to melt and spray the hard-facing powders or wires, the thermal spray processes may be further divided into flame power/wire, high velocity oxyfuel (HVOF), detonation gun, and plasma spray. Various embodiments may include a thermal spray process to manufacture the gradient HEA, MEA, HEC, and/or MEC surface coatings. The method employs a dual feeder system and scheduled feeding profile to feed the proper amount of HEA, MEA, HEC, and/or MEC powders and steel core powder into the heating/melting chamber. The mixture of the two powders in fine liquid droplets is carried by the processing gas at a high travel speed in the range of 800 m/s and impacts on substrate surface to form a bonded hard-facing. By controlling the movement of the spray gun relative to the stationary substrate target surface, different coating thickness and surface area profiles can be achieved.

In at least one embodiment, the gradient material structure has a pad or ring design. The pad or ring can be then bonded to a metal valve seat or other tools by traditional joining techniques such as welding, brazing, sintering, and the like. The steel base of the GMS pad may be the same metal material as the metal valve seat, which makes the joining to the metal valve seat much easier with a strong joint.

Various embodiments of the present disclosure may address or overcome common problems associated with existing techniques. By way of example, abrasive wear and fatigue cracking in valve seals are traditionally addressed using methods such as: 1) carburized and case hardened valve seats; 2) carbide insert valve seats; and 3) thermal sprayed hard-facing valve seats, among others. All of these techniques, however, share one common problem, namely, the weak bonding interface at or near the boundary of the hard surface layer (for example, the hardened case, the insert, or the hard-facing) and steel core. This weak bonding interface may be caused by the residual stresses at the case/core boundary due to a sharp mismatch of the thermal and mechanical properties of the hard surface layer and soft steel core. For example, shown in the graphical representation of FIG. 1A, a tensile residual stress near case/core boundary of a carburized and case hardened steel valve seat is developed due to thermal and mechanical mismatch between the hardened case and core. This tensile residual stress significantly decreases the impact fatigue resistance and stress corrosion cracking resistance of the valve seats. Embodiments of the present disclosure address the industry need for new material and processing technologies that are able to greatly decrease or completely eliminate the thermal and mechanical mismatches, and therefore the residual tensile stresses at the surface hardened layer and the core.

Figure 1B:
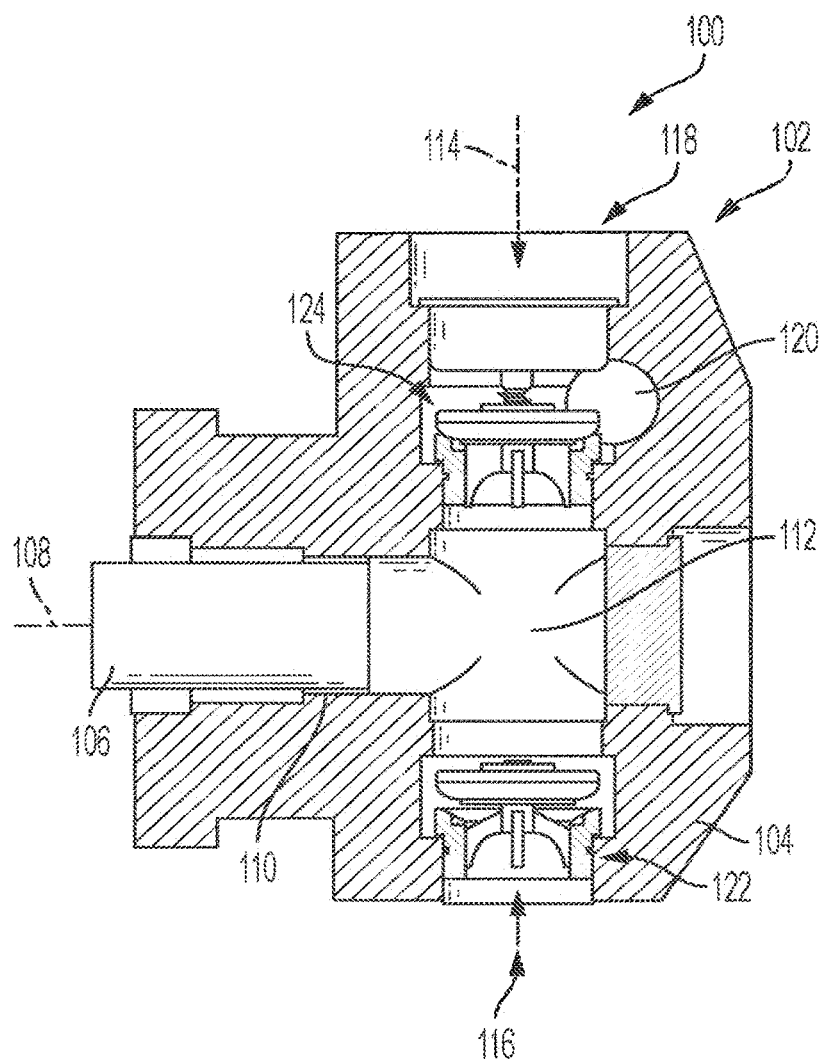
FIG. 1B is a schematic cross-sectional view of an embodiment of a pump assembly, in accordance with embodiments of the present disclosure.

FIG. 1B is a schematic cross-sectional view of an embodiment of a pump assembly 100, which may also be referred to as a reciprocating pump assembly and/or a reciprocating pump. The pump assembly 100 may be utilized during hydraulic fracturing operations, among other operations, where a working fluid (for example, fracturing fluid, slurry, etc.) is introduced into the pump and energy is added to the working fluid to increase a pressure of the working fluid. Fracturing fluid, by way of example only, may include corrosives and particulates, such as sand or ceramics, which are utilized during fracturing operations. These corrosives and particulates cause erosion within the pump assembly 100, which may undesirably affect fracturing operations and lead to down times to replace various components. Additionally, the fracturing fluids may include corrosive acids and the like, which may wear down components of the pump assembly 100.

It should be appreciated that various components of the pump assembly 100 have been removed for clarity with the following discussion. For example, a power end has been removed in favor of focusing on the illustrated fluid end 102 of the pump assembly 100. The power end may include a crankshaft that is driven by an engine or motor to facilitate operations. The fluid end 102 includes a fluid end block 104 that may house one or more components discussed herein. A plunger rod 106 is driven (for example, via the crankshaft) to reciprocate within the fluid end block 104 along a plunger axis 108. The plunger rod 106 is positioned within a bore 110 extending through at least a portion of the fluid end block 104. The illustrated bore 110 is arranged along the plunger axis 108 (first axis) and intersects a pressure chamber 112, which is arranged along a pressure chamber axis 114 (second axis), which is positioned substantially perpendicular to the plunger axis 108. It should be appreciated that the pump assembly 100 may include multiple plunger rod and pressure chamber arrangements, which may be referred to as a plunger throw. For example, the pump assembly 100 may be a triplex pump, quadplex pump, quintuplex pump, and the like.

The illustrated fluid end block 104 includes an inlet passage 116 and an outlet passage 118, which are generally coaxial and arranged along the pressure chamber axis 114. In other words, the inlet passage 116 and the outlet chamber 118 are axially aligned with respect to one another and/or the pressure chamber 112. In various embodiments, fluid enters the pressure chamber 112 via the inlet passage 116, for example on an up stroke of the plunger rod 106, and the fluid is driven out of the pressure chamber 112 to an outlet passage 120, for example on a down stroke of the plunger 106.

Respective valve assemblies 122, 124 are arranged within the inlet passage 116 and the outlet chamber 118. These valve assemblies 122, 124 are spring loaded in the illustrated embodiment, but it should be appreciated that such an arrangement is for illustrative purposes only. In operation, a differential pressure may drive movement of the valve assemblies. For example, as the plunger rod 106 is on the upstroke, pressure at the inlet passage 116 may overcome the spring force of the valve assembly 122, thereby driving fluid into the pressure chamber 112. However, on the down stroke, the valve assembly 122 may be driven to a closed position, while the spring force of the valve assembly 124 is overcome, thereby enabling the fluid to exit via the outlet passage 120.

In one or more embodiments, damage along valve seats associated with the valve assemblies 122, 124 may lead to leaks, which may reduce pumping efficiencies and lead to costly shut downs and repair operations. For example, working fluid associated with the pump may include solid particles, which may interact with a valve member as the valve member contacts the valve seat, thereby leading to scarring or other defects. Furthermore, corrosive materials may also wear out materials over time. Various embodiments of the present disclosure may include one or more valve seats having a gradient material structure (GMS) with a continuous composition change of one or more of an HEA, HEC, MEA, MEC, or combinations thereof proximate the strike face with a different substrate core. Accordingly, the strike face or surface locations most prone to damage or exposure to damaging material may be formed from materials more suitable for such conditions, while the structure of the material enables a smooth transition of material and thermal properties from the surface to the core. In at least one embodiment, a gradient composite structure includes continuous composition changes and smooth property transitions from the surface to the core.

Figure 2:
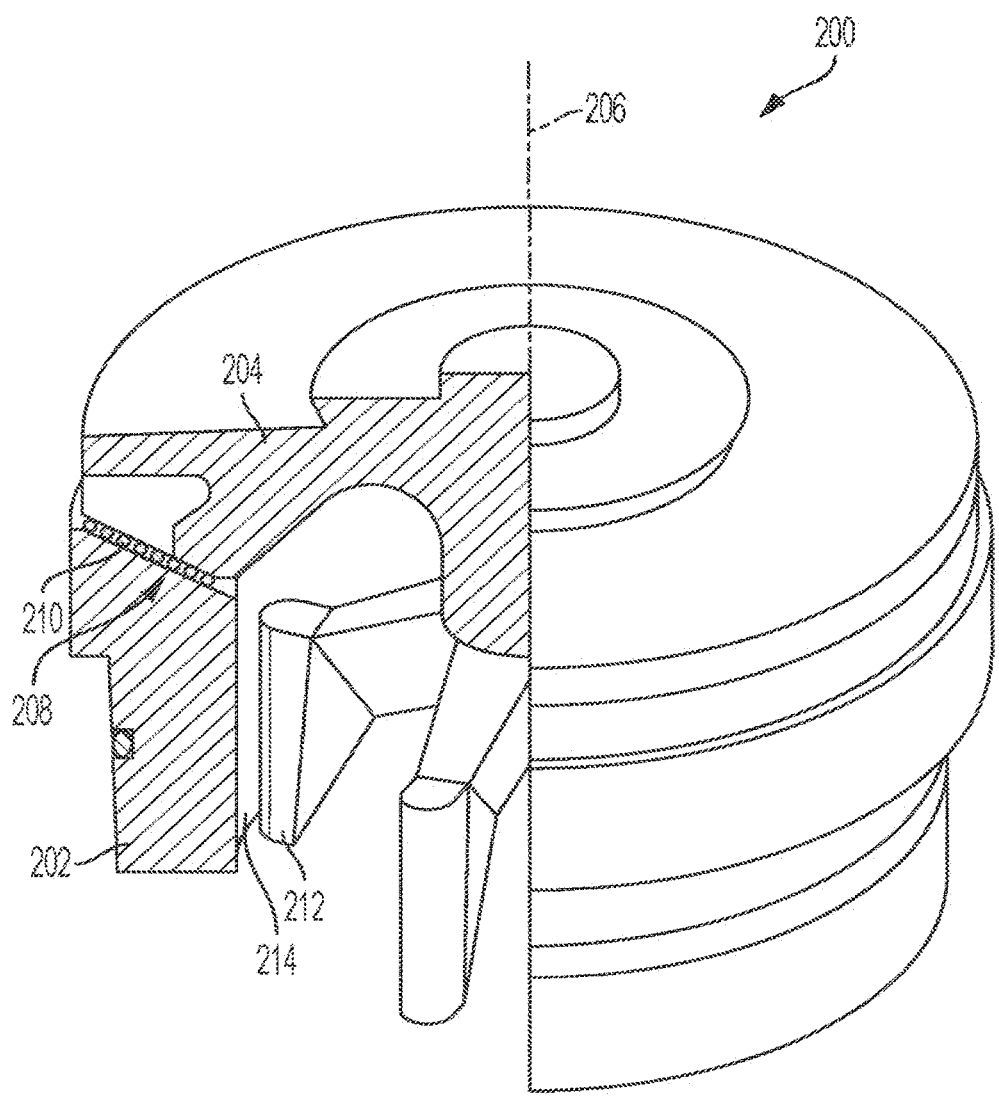
FIG. 2 is a cut-away perspective view of an embodiment of a valve assembly, in accordance with embodiments of the present disclosure.

FIG. 2 is a schematic cut away view of an embodiment of a valve assembly 200, such as the valve assemblies 122, 124, which may be utilized with a pump assembly. The illustrated valve assembly 200 includes a valve seat 202 and a valve member 204. It should be appreciated that the valve seat 202 may refer to the structure of the seat and may include multiple constituent components, such as a body, a strike face, and the like. In operation, the valve member 204 reciprocates along a valve axis 206, which may correspond to the pressure chamber axis 114, such that the valve member 204 moves into and out of contact with at least a portion of the valve seat 202. In the illustrated embodiment, particulates 210 have accumulated along the valve seat 202, for example at a strike face 208 (contact face). Repeated contact from the valve member 204 may drive the particulates 210 into the strike face 208, causing scarring or other damage. Additionally, corrosive fluids may contact other portions of the valve seat 202, in addition to the strike face 208. Damage to the valve seat 202 may cause the sealing capability of the valve assembly 200 to degrade, thereby reducing the effectiveness of the pump assembly.

In various embodiments, guide legs 212 of the valve member 204 may also lead to damage to various portions of the valve seat 202. For example, in the illustrated embodiment, the guide legs 212 extend into a bore 214 of the valve seat 202. Due to the presence of the corrosive fluid and/or the particulates, damage may occur along the bore 214, such as scarring. As a result, the pump assembly may be taken out of service for repairs, which may be expensive and contribute to non-productive time at the well site. Accordingly, embodiments of the present disclosure are directed toward systems and methods for forming improved valve seats, which may be part of valve assemblies.

Figure 3A:
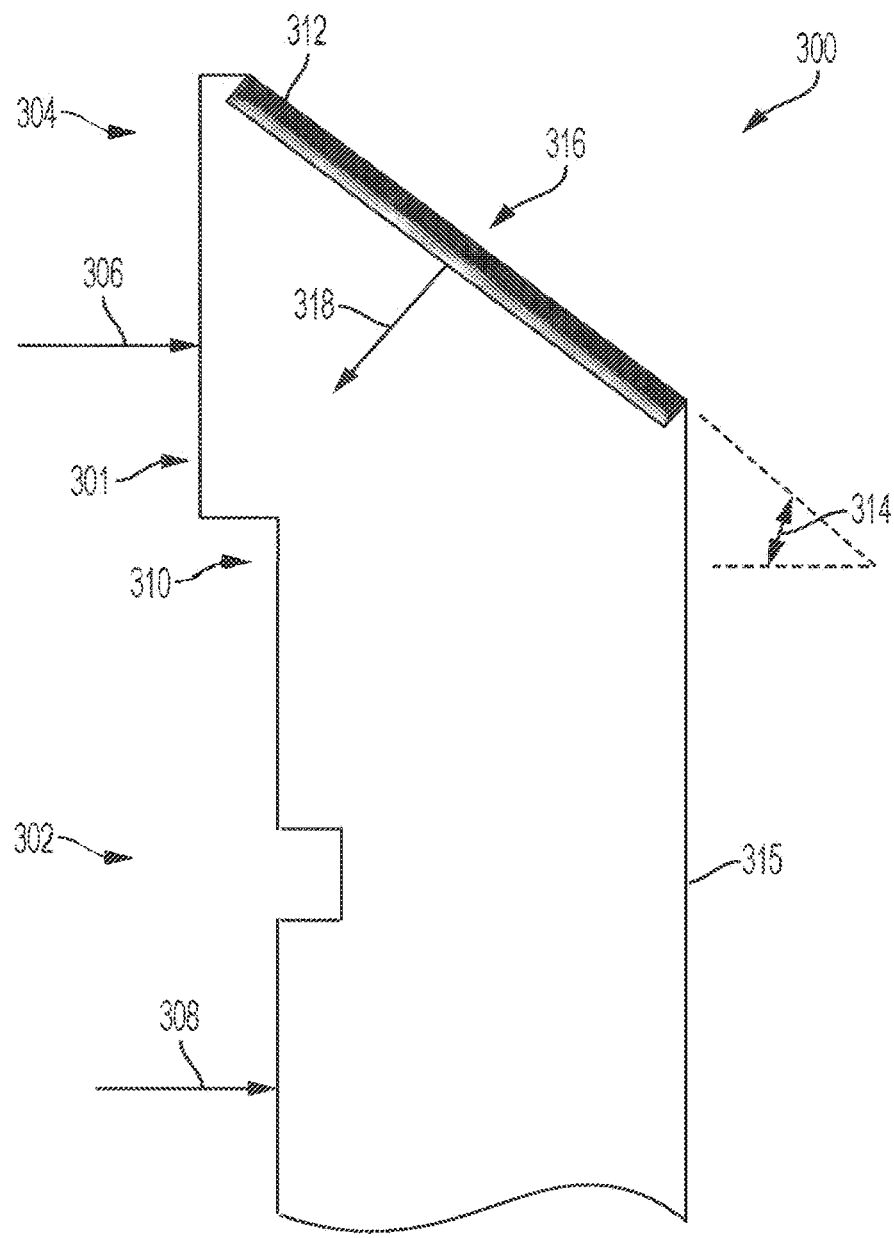
FIG. 3A is a cross-sectional view of an embodiment of a valve seat having a gradient material structure, in accordance with embodiments of the present disclosure.

FIG. 3A is a partial cross-sectional view of an embodiment of a valve seat 300, which may be utilized with one or more embodiments of the present disclosure. In this example, the valve seat 300 includes a body 301 having a lower portion 302 and an upper portion 304 (a top). The upper portion 304 may be referred to herein as a "first portion" of the body 301 and the lower portion 302 may be referred to herein as a "second portion" of the body 301. A bore 315 extends through both the upper portion 304 and the lower portion 302 of the body 301. The illustrated upper portion 304 has a larger outer diameter 306 than an outer diameter 308 of the lower portion 302, thereby forming or defining a shelf (or shoulder) 310 that may be used to support the valve seat 300 within a bore, such as within a bore of a pump. It should be appreciated that this illustrated configuration is for illustrative purposes only and that, in other embodiments, the respective outer diameters 306, 308 may be the same size or the outer diameter 308 may be larger than the outer diameter 306.

The upper portion 304 includes a strike face 312 arranged at an angle 314. It should be appreciated that the angle 314 may be particularly selected based, at least in part, on one or more operating conditions or mating components, such as a valve member. Furthermore, it should be appreciated that the angle 314 may not be constant along the strike face 312 and that more than one angle may be present to form a stepped strike face 312 and/or stepped portions that form at least a portion of the strike face 312. In this example, at least a portion of the valve seat 300 includes a gradient material structure (GMS) 316, which is schematically illustrated as defining at least a portion of the strike face 312 and extending into the upper portion 304.

In this example, the GMS 316 has a gradient composition that is approximately 100% HEA, MEA, HEC, MEC, or some combination thereof at or near the surface (strike face 312) and then gradually reduces toward a core, as illustrated by the arrow 318. In some embodiments, the arrow 318 may extend into the GMS 316 from the strike face 312 along a direction that is aligned with a normal (or perpendicular) direction relative to the outer surface of the strike face 312. For example, the GMS 316 may be approximately 100% HEA, MEA, HEC, MEC, or some combination thereof at or near the surface and then reduce to approximately 75%, 50%, 25% and then 0% along the path of the arrow 318. In some embodiments, the GMS 316 may have a thickness (for example, a thickness along the direction of arrow 318) that may range from about 0.05 millimeters (mm) to about 10 mm, or from about 0.1 mm to about 5 mm, or from about 0.1 mm to about 2 mm. As noted above, such a transition may avoid the problems experienced by traditional hard coatings that have thermal expansion and elastic modulus mismatches with the substrate core material. In contrast, the illustrated structure shows a smooth thermal and mechanical transition of material properties from the valve seat surface (strike face 312) to the core (or an internal portion of the valve seat 300). To that end, embodiments of the present disclosure provide reduced thermal residual tensile stress and increased impact cracking or stress corrosion cracking resistance while still maintaining high adhesion between materials.

Figure 3B:
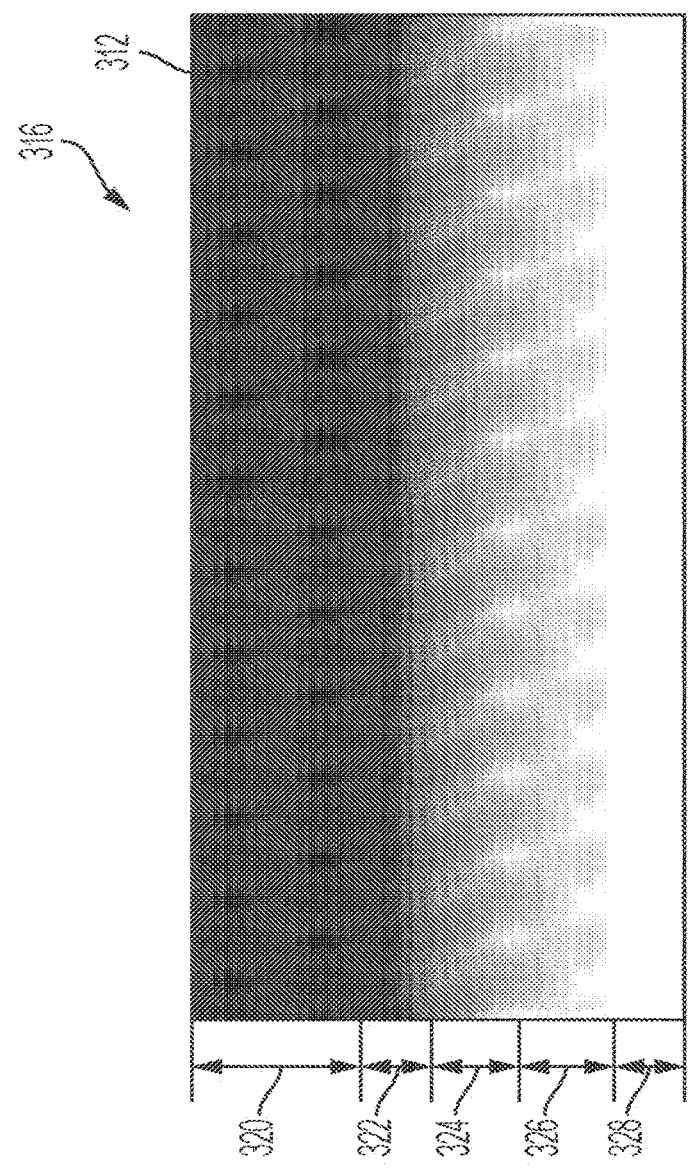
FIG. 3B is a cross-sectional view of an embodiment of a gradient material structure, in accordance with embodiments of the present disclosure.

FIG. 3B is a detailed cross-sectional view of an embodiment of the GMS 316 to illustrate the change between different percentages of HEA, MEA, HEC, MEC, or some combination thereof. In this example, the darker regions are representative of higher percentages of HEA, MEA, HEC, MEC, or some combination thereof when compared to the lighter regions. For example: a first region (or layer) 320 is approximately 100% HEA, MEA, HEC, MEC, or some combination thereof; a second region (or layer) 322 is approximately 75% HEA, MEA, HEC, MEC, or some combination thereof; a third region (or layer) 324 is approximately 50% HEA, MEA, HEC, MEC, or some combination thereof; a fourth region (or layer) 326 is approximately 25% HEA, MEA, HEC, MEC, or some combination thereof; and a fifth region (or layer) 328 illustrates the steel substrate of the valve seat 300. These percentages are provided by way of example only and are not intended to limit the scope of the present disclosure. Moreover, there may be more or fewer regions. In some embodiments, the percentage of HEA, MEA, HEC, MEC, or some combination thereof may change continuously through each of the regions 320, 322, 324, 326, 328, and the example percentages of HEA, MEA, HEC, MEC, or some combination thereof may represent maximum or average values of HEA, MEA, HEC, MEC, or some combination thereof within the regions 320, 322, 325, 326, 328. In some embodiments, the percentage of HEA, MEA, HEC, MEC, or some combination thereof may undergo step changes between the regions 320, 322, 324, 326, 328, and the example percentage of HEA, MEA, HEC, MEC, or some combination thereof provided above may be maintained (or substantially maintained) throughout each of the regions 320, 322, 324, 326, 328.

It should be appreciated that respective widths or thicknesses of the different regions may be particularly selected based, at least in part, on one or more design conditions. As a result, the regions 320, 322, 324, 326, 328 may not have the same thickness, the regions 320, 322, 324, 326, 328 may have the same thickness, some regions 320, 322, 324, 326, 328 may have the same thickness while others do not, and other such combinations.

Figure 4A:
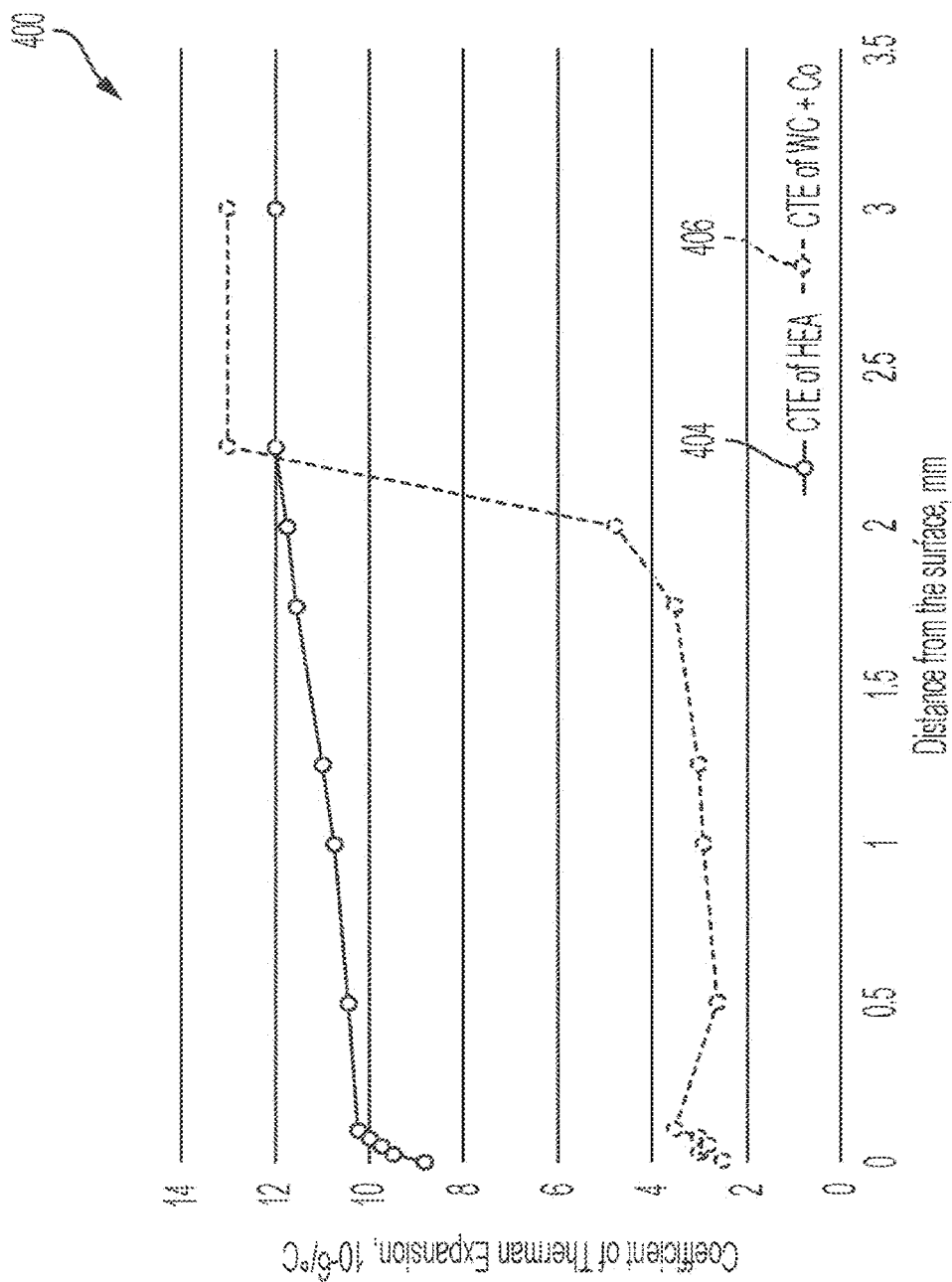
FIG. 4A is a graphical representation of coefficient of thermal expansion (CTE) profiles across a gradient material structure, in accordance with embodiments of the present disclosure.
Figure 4B:
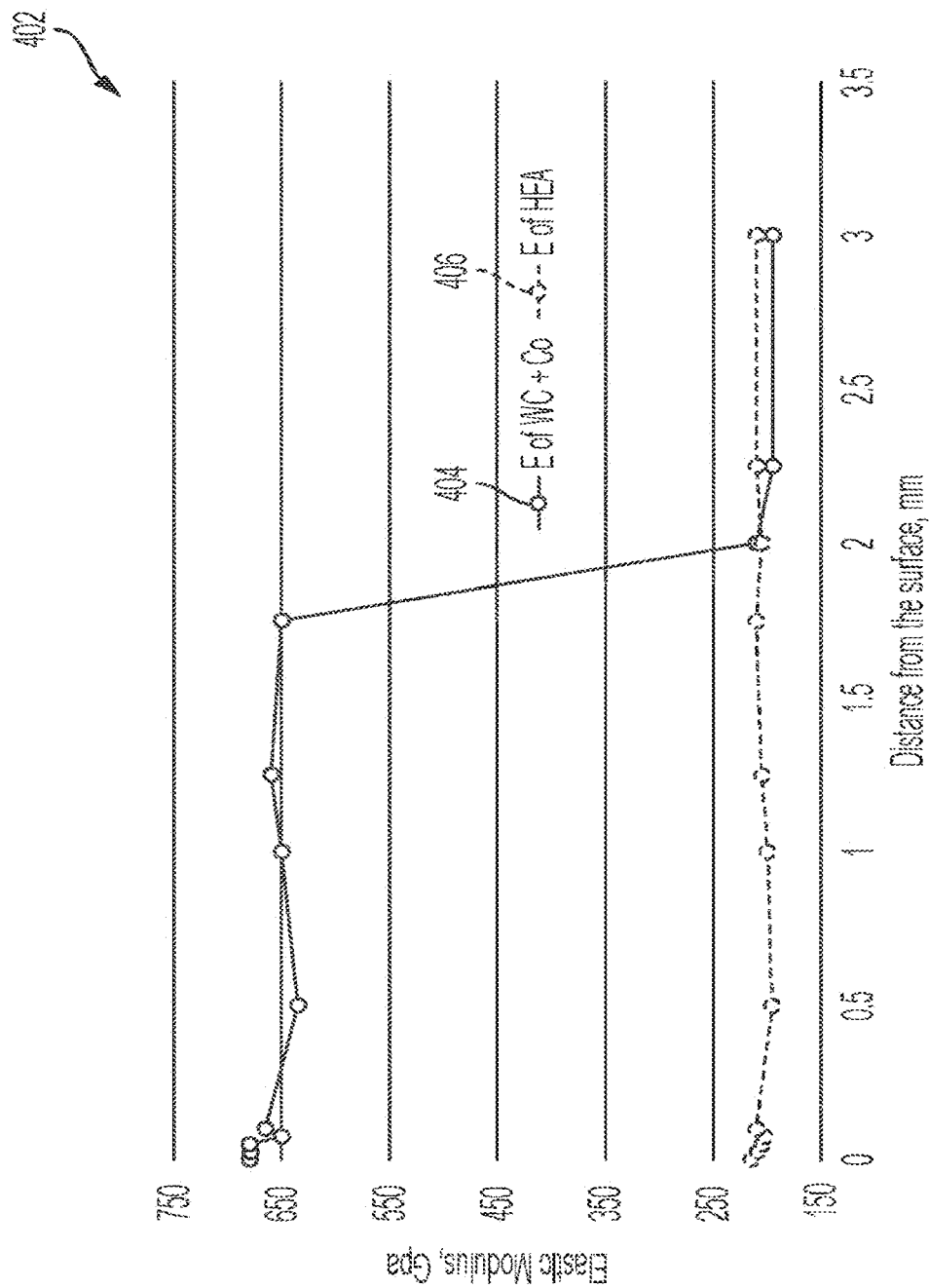
FIG. 4B is a graphical representation of elastic modulus profiles across a gradient material structure, in accordance with embodiments of the present disclosure.

FIGS. 4A and 4B are graphical representations 400, 402 of comparisons of coefficients of thermal expansion (CTE) and elastic modulus respectively between embodiments of the gradient material structure and a traditional WC coating that is deposited to the steel core base. In these examples, the x-axis represents distance from a surface (such as a depth). In the first representation 400 of FIG. 4A, the y-axis corresponds to CTE. In the second representation 402 of FIG. 4B, the y-axis corresponds to elastic modulus. In some embodiments, thermal properties, such as CTE, and/or mechanical properties, such as the elastic modulus, may smoothly transition within and/or may be substantially maintained throughout the gradient material structure as will be understood by those having ordinary skill in the art. As shown in FIG. 4A, the HEA 404 has a smooth transition of CTE as the distance from the surface increases into the steel core. In sharp contrast, the WC 406 shows a sharp spike at approximately 2 mm at the boundary interface between hard surface WC coating layer and steel core. As noted above, such a sharp change in the CTE may result in cracking or decoupling at the boundary interface under dynamic impact or cyclic loading conditions. Embodiments of the present disclosure overcome such problems while still maintaining superior resistance to abrasion and erosion due to the high surface hardness of the gradient material structure. FIG. 4B similarly shows a smooth transition with respect to the elastic modulus for HEA 404 and a sharp decline for WC 406 near or at the case/core boundary approximately 2 mm from the surface. It should be appreciated that CTE and elastic modulus are provided by way of example only, and various other thermal and mechanical properties illustrate similar transitions with respect to distance from the surface according to embodiments disclosed herein. The sharp changes illustrated by the WC 406 are a likely cause of failure with traditional hard coatings, leading to surface brittleness and cracking when subject to abrasive and/or dynamic loadings.

Figure 5:
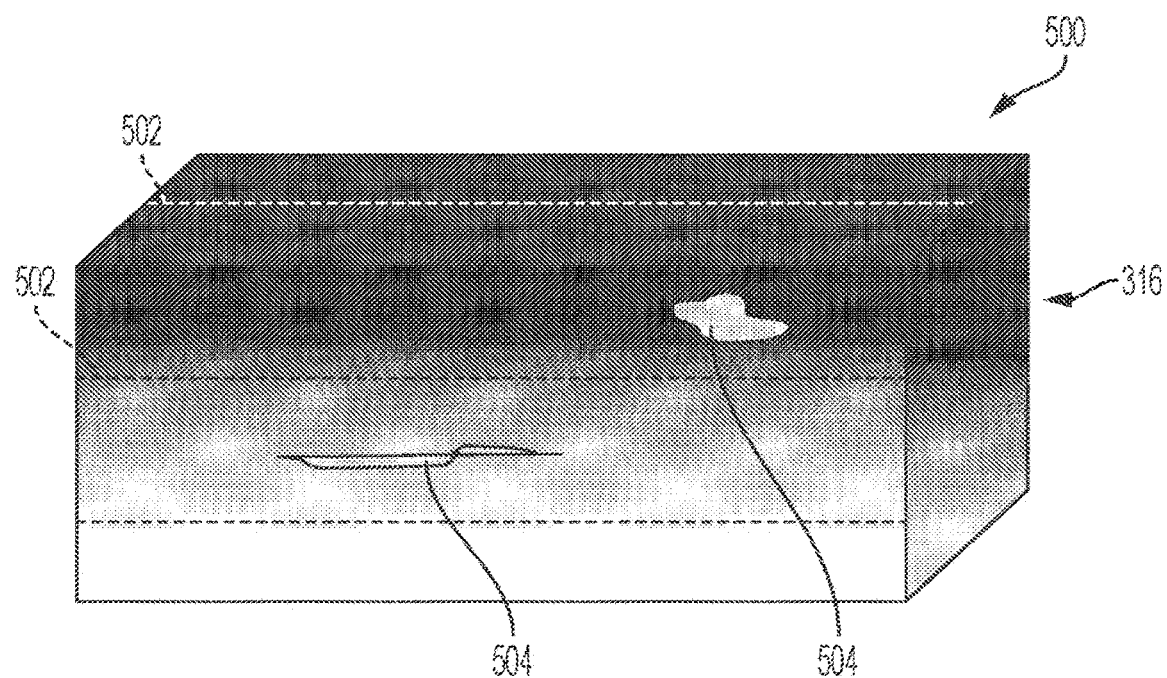
FIG. 5 is a sectional view of an embodiment of a composite structure with a gradient material structure, in accordance with embodiments of the present disclosure.

FIG. 5 is a cross-sectional view of an embodiments of a composite structure 500, which may include, at least in part, the GMS 316 and one or more additional materials, such as a matrix 502 and/or reinforcements 504. In at least one embodiment, the matrix 502 is a steel matrix that includes, but is not limited to, carbon steel, high strength low alloy steel, tool steel, bearing steel, stainless steel, and combinations thereof. In this example, the matrix 502 includes components that are arranged in a geometric pattern, but it should be appreciated that various other embodiments may include different matrix configurations. The illustrated reinforcements include ceramics (carbides, nitrides, oxides, etc.), cermets, intermetallic compounds in different forms, such as powders, fibers (short or continuous), nanoparticles or nano-tubes. In various embodiments, the composite structure has a gradient composition, having mechanical and thermal properties with maximum hard reinforcement wt % on the exterior surface and a gradual reduction to a core composition inwardly, and having a smooth thermal and mechanical property transition from surface to core.

Figure 6:
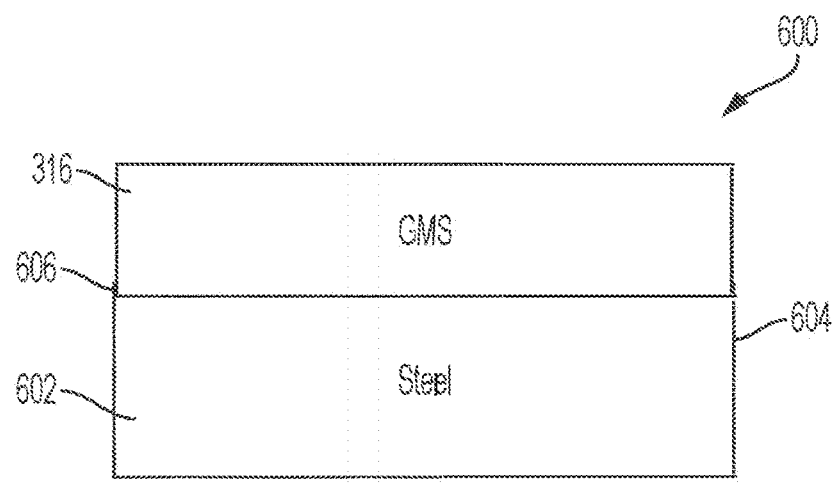
FIG. 6 is a cross-sectional view of an embodiment of a structure with a ring and a gradient material structure, in accordance with embodiments of the present disclosure.

FIG. 6 is a schematic cross-sectional view of an embodiment of a structure 600 that includes the GMS 316, a substrate base 602, and a pad or ring 604. In at least one embodiment, the pad 604 is bonded to the base 602, which may include bonding using one or more methods such as welding, brazing, sintering, or the like. The pad 604 and the base 602 may be formed from a similar metal, which may facilitate connection between the components. Thereafter, the GMS 316 may be installed within or positioned within a portion of the pad 604 and coupled to the base 602. For example, a finger or lip 606 may extend axially above the base 602 to receive and support the GMS 316.

Figure 7:
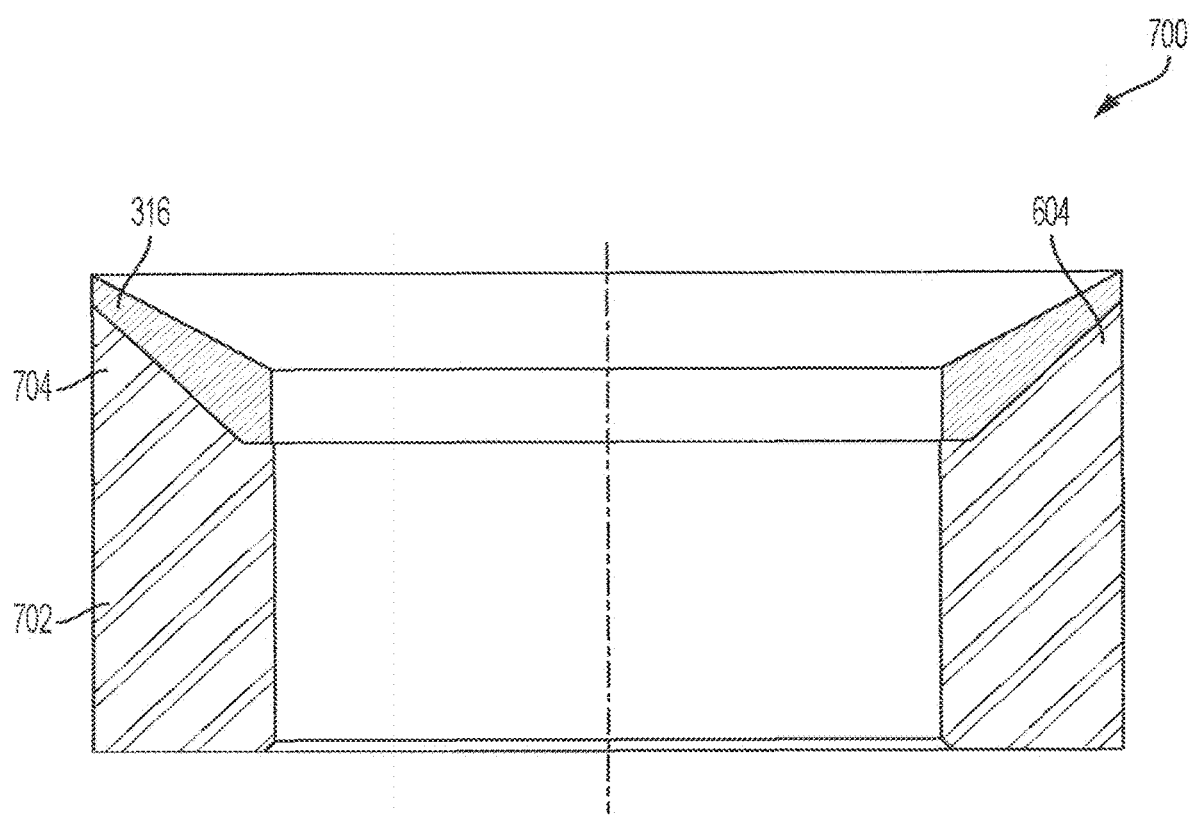
FIG. 7 is a cross-sectional view of an embodiment of a valve seat having a gradient material structure, in accordance with embodiments of the present disclosure.

FIG. 7 is a schematic cross-sectional view of an embodiment of a valve seat 700. In this example, the valve seat 700 includes a lower portion 702 and an upper portion 704. A portion of the upper portion is formed by the GMS 316, which may further be arranged within the ring 604.

Figure 8:
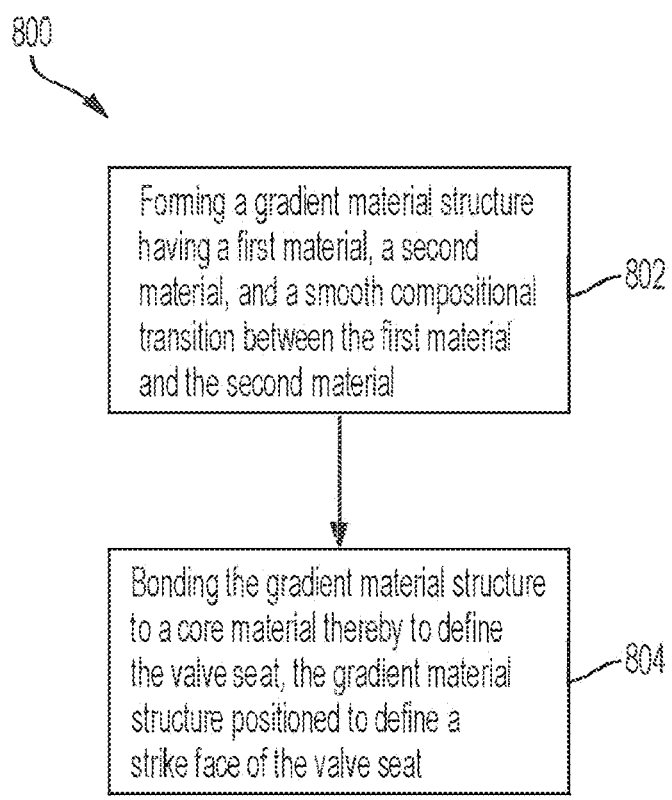
FIG. 8 is a diagram of a method of forming a valve seat according to some embodiments of the present disclosure.

FIG. 8 is a diagram of a method 800 of forming a valve seat for a pumping assembly according to some embodiments of the disclosure. In some embodiments, the embodiments of method 800 may be performed to form structures or components for other applications, other than valve seats (such as plungers, mixer blades, and the like that may be utilized within frac pumps, mud pumps, waste water pumps, sand blenders and mixers, earth moving and mining equipment, harvester blades, wind energy turbine blades, and the like). Thus, the specific application of embodiments of method 800 for forming valve seats shown in FIG. 8 and described herein is merely illustrative of some applications of embodiments of method 800.

Initially, method 800 includes, at block 802, forming a gradient material structure having a first material, a second material, and a smooth compositional transition between the first material and the second material. For instance, in some embodiments, the gradient material structure at block 802 may include the GMS 316 shown in FIG. 3 and described herein. Thus, in some embodiments, the first material at block 802 may include a resistant material such as, for instance HEA, MEA, HEC, MEC, or some combination thereof. In some embodiments, the second material at block 802 may include a core material that is also used to form the valve seat.

In some embodiments, the gradient material structure may be formed at block 802 via one or more of thermal spraying, vapor deposition, powder metallurgy, brazing, hot isostatic pressing, pressure die forging, 3D printing, laser surface alloying or cladding, and welding as previously described herein. In some embodiments, the gradient material structure formed at block 802 may have any suitable shape, such as for instance a pad or ring shape.

As shown in FIG. 8, the method 800 may also include, at block 804, bonding the gradient material structure to a core material thereby to define the valve seat, the gradient material structure positioned to define a strike face of the valve seat. For instance, as previously described above, the gradient material structure may be bonded to a core material of a metal valve seat (or other tools or components), as will be understood by one having ordinary skill in the art, via welding, brazing, sintering, and the like. As previously described for the valve seat 300 shown in FIG. 3, the gradient material structure 312 may define a strike face 312 (or at least a portion of the strike face 312) for the valve seat 300. In some embodiments, the second material of the gradient material structure may be bonded to the core material so as to define the valve seat. As previously described, in some embodiments, the second material of the gradient material structure may be the same (or substantially the same) as the core material of the valve seat (or other tool or component) as will be understood by one having ordinary skill in the art. Without being limited to this or any other theory, ensuring that the second material is the same (or substantially the same) as the core material so as to define the valve seat, the bonding at block 804 may promote a stronger bond between the gradient material structure and the core material of the valve seat.

The foregoing disclosure and description of the disclosed embodiments is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents.

This application is a continuation of U.S. application Ser. No. 18/099,069, filed Jan. 19, 2023, titled "GRADIENT MATERIAL STRUCTURES AND METHODS OF FORMING THE SAME", which claims the benefit of and priority to U.S. Provisional Patent Application No. 63/300,874, filed Jan. 19, 2022, titled "VALVE WITH A GRADIENT SURFACE STRUCTURE," the contents of all of which are incorporated herein by reference in their entireties.

Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

The invention claimed is:

1. A valve seat for a pumping assembly, the valve seat comprising:
   a body having a strike face defined by a gradient material structure, the gradient material structure having:
   a first material at a surface of the strike face,
   a second material spaced from the surface of the strike face, and
   a transition material between the surface of the strike face and the second material, the transition material having percentages of hard reinforcement less than the surface of the strike face so that the percentage of hard reinforcement transitions between the first material and the second material; and
a bore extending through the body.

2. The valve seat of claim 1, wherein a coefficient of thermal expansion of the gradient material structure smoothly transitions from the surface of the strike face to a core of the body.

3. The valve seat of claim 2, wherein the first material of the gradient material structure has a fracture toughness in a range of 60 to 200 MPa(m)$^{1/2}$ and a Vickers hardness in a range of 800 HV to 1400 HV.

4. The valve seat of claim 2, wherein the gradient material structure has a thickness in a range from about 0.05 millimeters (mm) to about 10 mm.

5. The valve seat of claim 2, wherein the gradient material structure is formed and bonded to a core material of the body by use of one or more of thermal spraying, vapor deposition, powder metallurgy, brazing, hot isostatic pressing, pressure die forging, 3D printing, laser surface alloying or cladding, or welding.

6. The valve seat of claim 5, wherein the coefficient of thermal expansion is in a range of 8-11×10$^{-6}$/° C.

7. The valve seat of claim 2, wherein an elastic modulus of the gradient material structure smoothly transitions from the surface of the strike face to a core of the body.

8. The valve seat of claim 7, wherein the elastic modulus is in a range of 195-220 Gpa.

9. The valve seat of claim 2, wherein the body includes an upper portion and a lower portion, wherein the gradient material structure is connected to the upper portion, and wherein the bore extends through both the upper portion and the lower portion.

10. The valve seat of claim 1, wherein the first material of the gradient material structure includes one or more of a high entropy alloy, a medium entropy alloy, a high entropy ceramic, a medium entropy ceramic, or a cermet.

11. The valve seat of claim 10, wherein the first material of the gradient material structure includes a high entropy alloy, and the high entropy alloy includes one or more of Tungsten, Vanadium, Niobium, Molybdenum, Tantalum, Iron, Cobalt, Manganese, Chromium, or Nickel.

12. The valve seat of claim 10, wherein the first material of the gradient material structure includes a high entropy alloy, and the high entropy alloy includes a combination of five or more different materials, the five or more different materials selected from the group comprising: Tungsten, Vanadium, Niobium, Molybdenum, Tantalum, Iron, Cobalt, Manganese, Chromium, and Nickel.

13. The valve seat of claim 12, wherein the combination includes substantially equal amounts of the five or more different materials.

14. The valve seat of claim 12, wherein the combination has a larger proportion of the five or more different materials.

15. The valve seat of claim 10, wherein the first material of the gradient material structure includes a high entropy ceramic, and the high entropy ceramic comprises a multi-component including one or more of ceramic oxides, carbide, nitrides, silicides or borides.

16. The valve seat of claim 1, wherein the transition material includes continuous compositional changes to transition from the first material to the second material.

17. A structure for a contact surface, the structure comprising:
a gradient material structure having:
an exterior surface including a first material having a first percentage of a resistant material,
an interior location including a second material having a second percentage of the resistant material less than the first percentage, and
a transition location between the exterior surface and the interior location, the transition location including a transition material so that the percentages of the resistant material of the transition location changing from the first percentage at the exterior surface to the second percentage at the interior location.

18. The structure of claim 17, wherein one or more of a thermal property or a mechanical property is substantially maintained throughout the gradient material structure between the exterior surface and the interior location.

19. The structure of claim 17, wherein the gradient material structure is bound to a base material that is different from the gradient material structure.

20. The structure of claim 17, wherein the resistant material includes one or more of a high entropy alloy, a medium entropy alloy, a high entropy ceramic, a medium entropy ceramic, or a cermet.

21. The structure of claim 17, wherein the percentages of the resistant material of the transition location include a plurality of stepped decreases, each step of the plurality of stepped decreases being approximately equal.

22. A method of manufacturing a valve seat, the method comprising:
producing a gradient material structure having:
a first portion including a first percentage of a first material and a first percentage of a second material,
a second portion spaced from the first portion and having a second percentage of the first material less than the first percentage of the first material, and
a third portion between the first portion and the second portion, the third portion including a third portion percentage of the first material between (a) the first percentage of the first material and (b) the second percentage of the first material so as to provide a transition between the first percentage of the first material and the second percentage of the first material; and
bonding the gradient material structure to a core material so as to define a strike face of the valve seat.

23. The method of claim 22, wherein the producing the gradient material structure comprises applying varying amounts of the first material and the second material onto a substrate via a thermal spraying process.

24. The method of claim 23, wherein the substrate includes the core material so that the combination of the gradient material structure and the core material at least partially defines the valve seat.

25. The method of claim 22, wherein the producing the gradient material structure comprises applying the first material and the second material so as to define a plurality of layers within the gradient material structure, each layer of the plurality of layers having a different amount of the first material and the second material than an adjacent layer of the plurality of layers.

26. The method of claim 22, wherein the producing the gradient material structure comprises producing the gradient material structure by one or more of thermal spray, vapor deposition, powder metallurgy, brazing, hot isostatic pressing, pressure die forging, 3D printing, laser surface alloying or cladding, or welding.

27. The method of claim 26, wherein the bonding comprises bonding the gradient material structure to the core material so as to define the valve seat by use of one or more of welding, brazing, or sintering.

28. The method of claim 22, wherein the first material of the gradient material structure includes one or more of a high entropy alloy, a medium entropy alloy, a high entropy ceramic, a medium entropy ceramic, or a cermet.

29. The method of claim 28, wherein the first material of the gradient material structure includes a high entropy alloy, and the high entropy alloy includes one or more of Tungsten, Vanadium, Niobium, Molybdenum, Tantalum, Iron, Cobalt, Manganese, Chromium, or Nickel.

30. The method of claim 28, wherein the first material of the gradient material structure includes a high entropy ceramic, and the high entropy ceramic comprises a multi-component including one or more of ceramic oxides, carbide, nitrides, silicides or borides.

* * * * *